US008830479B2

(12) United States Patent
Qiu et al.

(10) Patent No.: US 8,830,479 B2
(45) Date of Patent: Sep. 9, 2014

(54) RFOG WITH OPTICAL HETERODYNING FOR OPTICAL SIGNAL DISCRIMINATION

(71) Applicant: Honeywell International Inc., Morristown, NJ (US)

(72) Inventors: Tiequn Qiu, Glendale, AZ (US); Lee K. Strandjord, Tonka Bay, MN (US); Glen A. Sanders, Scottsdale, AZ (US); Mary K. Salit, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 88 days.

(21) Appl. No.: 13/751,833

(22) Filed: Jan. 28, 2013

(65) Prior Publication Data

US 2014/0211211 A1    Jul. 31, 2014

(51) Int. Cl.
G01C 19/72    (2006.01)
(52) U.S. Cl.
CPC ................................ *G01C 19/727* (2013.01)
USPC .......................................................... 356/461
(58) Field of Classification Search
USPC .................... 356/460, 461, 463, 484
See application file for complete search history.

(56) References Cited

U.S. PATENT DOCUMENTS

| RE34,121 E | 11/1992 | Benoist |
| 5,442,442 A * | 8/1995 | Kanegsberg et al. ......... 356/473 |
| 5,469,257 A | 11/1995 | Blake et al. |
| 5,734,469 A | 3/1998 | Strandjord |
| 5,767,968 A | 6/1998 | Strandjord |
| 5,781,300 A | 7/1998 | Strandjord |
| 5,926,275 A | 7/1999 | Sanders et al. |
| 7,372,574 B2 | 5/2008 | Sanders et al. |
| 7,751,055 B2 | 7/2010 | Sanders et al. |
| 7,864,328 B2 * | 1/2011 | Strandjord .................... 356/461 |
| 7,933,020 B1 | 4/2011 | Strandjord et al. |
| 8,009,296 B2 | 8/2011 | Sanders et al. |
| 8,213,019 B2 | 7/2012 | Strandjord et al. |
| 8,223,341 B2 * | 7/2012 | Strandjord et al. ........... 356/461 |
| 2010/0002239 A1 | 1/2010 | Strandjord et al. |
| 2011/0292396 A1 | 12/2011 | Strandjord et al. |

OTHER PUBLICATIONS

U.S. Patent and Trademark Office, "Notice of Allowance", U.S. Appl. No. 12/876,796, Mar. 5, 2012, pp. 1-34.
Rakhmanov, "Demodulation of Intensity and Shot Noise in the Optical Heterodyne Detection of Laser Interferometers for Gravitional WA", "Applied Optics", Dec. 20, 2001, pp. 6596-6605, vol. 40, No. 36.

* cited by examiner

*Primary Examiner* — Michael A Lyons
(74) *Attorney, Agent, or Firm* — Fogg & Powers LLC

(57) ABSTRACT

In one embodiment a system including a resonator fiber-optic gyroscope configured to measure rotation rate is provided. The resonator fiber-optic gyroscope includes a sensing resonator have a first resonance frequency for a first laser beam propagation direction and a second resonance frequency for a second laser beam propagation direction, an optical mixer coupled to an output of the sensing resonator and configured to mix an output of the sensing resonator with a reference laser, wherein the optical mixer outputs a beat signal, and a resonance tracking electronics coupled to the optical mixer. The resonance tracking electronics are configured to demodulate the beat signal at a frequency offset to produce first in-phase and quadrature demodulated information, generate R-squared information from a sum of squares of the first in-phase and quadrature demodulated information, and demodulate the R-squared information at a resonance tracking modulation frequency.

20 Claims, 8 Drawing Sheets

RFOG WITH OPTICAL HETERODYNING FOR OPTICAL SIGNAL DISCRIMINATION

BACKGROUND

Gyroscopes (also referred to herein as gyros) have been used to measure rotation rates or changes in angular velocity about an axis of rotation. A basic conventional fiber-optic gyro (FOG) includes a light source, a beam-generating device, and a coil of optical fiber coupled to the beam generating device that encircles an area. The beam-generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate that is normal to the enclosed area.

In a conventional resonator FOG (RFOG), the counter-propagating light beams are typically monochromatic (e.g., in a single frequency) and circulate through multiple turns of the fiber-optic coil and for multiple passes through the coil using a device, such as a fiber coupler, that redirects light that has passed through the coil back into the coil again (i.e., circulates the light). The beam-generating device modulates and/or shifts the frequencies of each of the counter-propagating light beams so that the resonance frequencies of the resonator coil may be measured. The resonance frequencies for each of the CW and CCW paths through the coil are determined according to a constructive interference condition such that all light-waves having traversed the coil a different number of times interfere constructively at any point in the coil. As a result of this constructive interference, an optical wave having a wavelength λ is referred to as "on resonance" when the round trip resonator pathlength is equal to an integral number of wavelengths. A rotation about the axis of the coil produces a different pathlength for clockwise and counter-clockwise propagation, thus producing a shift between the respective resonance frequencies of the resonator. The frequency difference, such as may be measured by tuning the CW beam and CCW beam frequencies to match the resonance frequency shift of the closed optical path due to rotation, indicates the rotation rate.

To lock the external laser beams to the resonances, sinusoidal phase (or equivalently frequency) modulation is applied to the input beams. However, the modulation of the light beam also has imperfections associated with it. There are at least two types of modulator imperfections that can result in rotation-sensing errors. One type is modulator induced intensity modulation. Even though the intended modulation is either cavity length, optical frequency or optical phase, a non-ideal modulator will also generate a modulation of the light intensity which can have a component at the modulation frequency. The unwanted intensity modulation will be detected by the demodulator and interpreted as a signal indicating an off resonance condition. Resonator tracking electronics will then move the laser frequency away from the resonance frequency until the normal resonator intensity signal exactly cancels out the unwanted intensity signal. The deviation away from the resonance frequency results in a rotation sensing error if the unwanted intensity signals are different between the two counter-propagating light waves.

Another modulator imperfection that can result in rotation-sensing errors is modulation distortion. Modulation distortion can occur at the modulator drive electronics or the modulator. An ideal modulation is a sinusoidal modulation at a single frequency. However, distortion can result in the generation of higher harmonics on the modulation. Even harmonic modulation will result in a resonance detection error which can lead to a rotation sensing error, typically called bias error or simply bias.

One effective way to reduce the bias errors is to use common modulation on the CW and CCW beams so that cancellation of the bias in the two directions can be substantial. This is because the same amount of intensity modulation and modulation distortion are generated on both beams, leading to equal amount of errors that can be subtracted out in the signal processing unit. However, common modulation creates a new challenge to distinguish beams from different lasers. The unwanted back-reflected light of one beam into the path and direction of the other beam will cause new errors that could have been avoided if beams in opposite directions are modulated at different frequencies with separate modulators.

Prior art provides a means for employing common modulation while discriminating between the various optical beams. Balanced heterodyne detection has been taught to provide a means for discriminating between the various optical beams. In this system the various optical beams (slaves) are generated from one master laser. Each slave has a unique frequency separation from the master laser. By interfering the resonator output beams with a portion of the master beam using balanced heterodyne detector, beams from each slave will generate a unique beat note. By using synchronous phase sensitive demodulation techniques, each beat note can be separated from other beat notes, therefore, the signal from each beam can be separated from signals from the other beams while employing common modulation.

SUMMARY

In one embodiment a system including a resonator fiber-optic gyroscope configured to measure rotation rate is provided. The resonator fiber-optic gyroscope includes a sensing resonator have a first resonance frequency for a first laser beam propagation direction and a second resonance frequency for a second laser beam propagation direction, an optical mixer coupled to an output of the sensing resonator and configured to mix an output of the sensing resonator with a reference laser, wherein the optical mixer outputs a beat signal, and a resonance tracking electronics coupled to the optical mixer. The resonance tracking electronics are configured to demodulate the beat signal at a frequency offset to produce first in-phase and quadrature demodulated information, generate R-squared information from a sum of squares of the first in-phase and quadrature demodulated information, and demodulate the R-squared information at a resonance tracking modulation frequency.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments. However, it is to be understood that other embodiments may be utilized and that logical, mechanical and electrical changes may be made.

A problem with the balanced heterodyne method is that the relative phase shift between the optical beam to be detected and the master laser optical reference to the balanced heterodyne detectors can change significantly with temperature and other gyro parameters. The change in the relative phase results in signal instabilities after demodulation.

Figure 1:
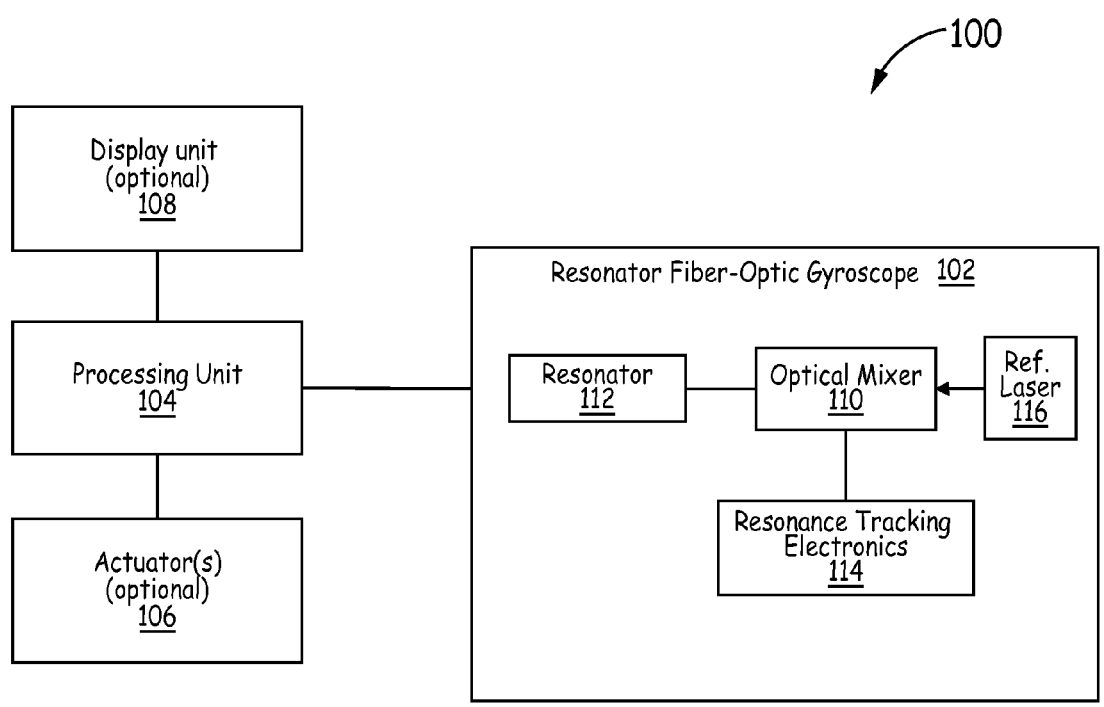
FIG. 1 is a block diagram of an embodiment of a system utilizing a RFOG.

FIG. 1 is a block diagram of one embodiment of a system 100 utilizing a RFOG 102 that is less sensitive to such relative phase noise. The system 100 is a navigation system in this embodiment. However, it is understood that, in other embodiments resonator fiber-optic gyroscope (RFOG) 102 can be used in other systems, such as, but not limited to, a platform stabilization system or a pointing system. For example, in some embodiments, the RFOG 102 is implemented as part of an inertial sensor unit that includes one or more RFOGs and one or more linear accelerometers. The RFOG 102 measures rotation rate and outputs a signal indicative of rotation rate to a processing unit 104. The processing unit 104 uses the measured rotation rate from the RFOG 102 to calculate parameters such as position, orientation, and angular velocity.

The processing unit 104 uses the calculated parameters, in some embodiments, to calculate control signals that are outputted to one or more optional actuators 106. For example, in some embodiments, the navigation system 100 is implemented in an unmanned vehicle. Hence, the actuators 106 are implemented according to the vehicle type. For example, in an unmanned aerial vehicle, the actuators 106 are implemented as wing flaps, thrusters, etc.

Additionally, in some embodiments, the processing unit 104 outputs the calculated parameters to an optional display unit 108. For example, in some embodiments, the display unit 108 displays the geographic location, velocity, and/or orientation (e.g. pitch, roll, and/or yaw) of a vehicle in which the RFOG 102 is located. The display unit 108 can be implemented as any suitable display unit such as, but not limited to, various CRT, active and passive matrix LCD, and plasma display units.

The RFOG 102 is configured for improved error correction of rotation sensing errors. In particular, the RFOG 102 includes an optical mixer 110 coupled between an output of a resonator 112 and an input of a resonance tracking electronics 114. The optical mixer 110 optically mixes a reference laser 116 with the output of the resonator 112 to create a beat signal. In particular, the resonance tracking electronics 114 can then discriminate between rotational information and rotation-sensing errors by distinguishing between the beat frequencies of the beat signal.

Figure 2:
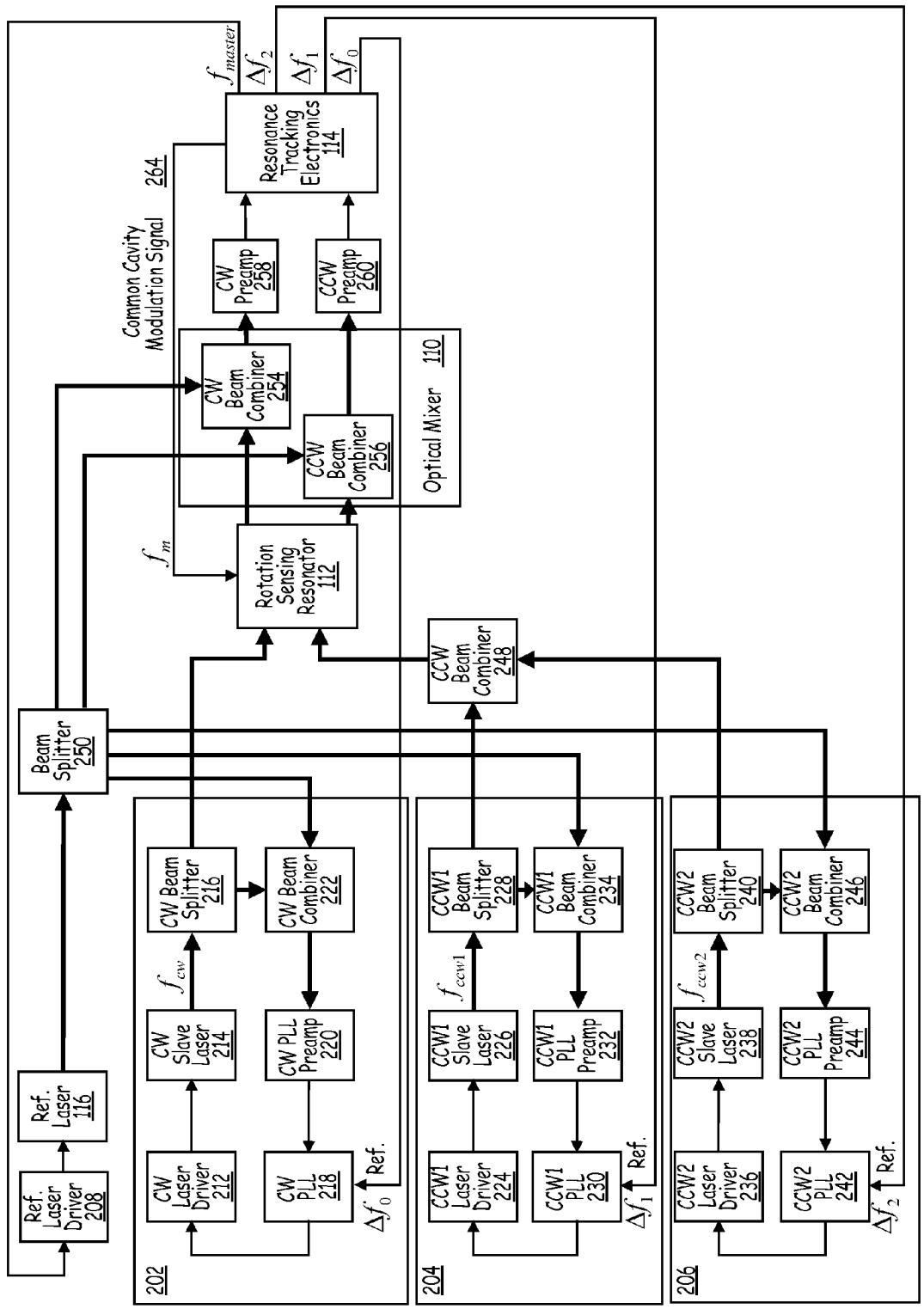
FIG. 2 is a block diagram of an embodiment of a RFOG.

FIG. 2 is a block diagram of one exemplary embodiment of a RFOG 102. RFOG 102 includes the optical mixer 110 between the output of the rotation-sensing resonator 112 and the resonance tracking electronics 114. In particular, as shown in FIG. 2, optical mixer 110 includes a clockwise (CW) beam combiner 254 coupled between a first output of the resonator 112 and the resonance tracking electronics 114, and a counter-clockwise (CCW) beam combiner 256 coupled between a second output of the resonator 112 and the resonance tracking electronics 114.

The RFOG 102 also includes one or more light sources to produce a reference laser beam, first laser beam, second laser beam, and a third laser beam. In the example shown in FIG. 2, the one or more light sources include as a reference laser source 116, a first laser source 202, a second laser source 204, and a third laser source 206 which generate their respective laser beams. In other examples, the one or more light sources can include a reference laser source to generate the reference laser beam and active optical modules to produce one or more of the first, second, and third laser beams from the reference laser beam. Combinations of laser sources and active optical modules can also be used to produce the first, second, and third laser beams.

In the example shown in FIG. 2, the reference laser source 116 generates a reference laser beam with a constant frequency $f_{ref}$ that a series of beam splitters 250 splits into five beams. A first beam goes to a CW beam combiner 222, a second beam goes to a first CCW (CCW1) beam combiner 234, a third beam goes to a second CCW (CCW2) beam combiner 246, a fourth beam goes to a CW beam combiner 254, and a fifth beam goes to a CCW beam combiner 256.

The first laser source 202 generates a first laser beam that is coupled into a first input of the resonator 112 to propagate therethrough in a clockwise (CW) direction. In this embodiment, the first laser source 202 comprises a CW laser driver 212, a CW slave laser 214, a CW beam combiner 222, a CW phase-lock-loop (PLL) preamp 220, and a CW phase-lock-loop (PLL) 218. The CW beam splitter 216 splits the CW slave laser 214 beam into two beams. One laser beam propagates from the first laser source 202 as the first laser beam and propagates through the rotation-sensing resonator 112 in a clockwise direction. The other laser beam goes to a CW beam combiner 222. CW beam combiner 222 optically mixes the reference laser 116 with other CW slave laser 214 beam. The optical mixing creates an intensity signal at the output of the CW beam combiner 222. The frequency of the intensity signal is the beat frequency between the CW slave laser 214 and reference laser 116. The CW PLL preamp 220 converts this intensity signal into an electrical signal. The CW PLL 218 locks the frequency of the CW slave laser 214 to the reference laser 116 with an additional CW frequency offset $\Delta f_0$ provided as a reference signal. The resonance tracking electronics 114 generate electronically the CW frequency offset reference $\Delta f_0$. The CW PLL 218 controls the CW laser frequency via the CW laser driver 212 in a feedback loop to maintain the beat signal of the CW frequency offset $\Delta f_0$ between the CW slave laser 214 and reference laser 116.

A second laser source 204 generates a second laser beam that is coupled into a second input of the resonator 112 to propagate therethrough in a counter-clockwise (CCW) direction. A third laser source 206 generates a third laser beam that is coupled into a second input of the resonator 112 to propagate therethrough in a counter-clockwise (CCW) direction.

The second laser source 204 and third laser source 206 are configured similarly to the first laser source 202. Both the second laser source 204 and the third laser source 206 use a phase lock loop (e.g. a CCW1 PLL 230 and a CCW2 PLL 242) to lock the respective laser source to a frequency offset from the reference laser 116. Likewise, the resonance tracking electronics 114 generate electronically the frequency offsets. In the case of a CCW1 slave laser 226 the frequency offset is $\Delta f_1$ and for a CCW2 slave laser 238 the frequency offset is $\Delta f_2$. The frequency of the CCW1 slave laser 226 is set to at least one free spectral range below the frequency of the CW slave laser 214. The frequency of the CCW2 slave laser 226 is set to at least one free spectral range above the frequency of CW slave laser 214. A CCW beam combiner 248 combines the beams of CCW1 slave laser 226 and CCW2 slave laser 238 to produce a combined input laser beam. The combined input laser beam output of the CCW beam combiner 248 then propagates through the rotation-sensing resonator 112 in the counter-clockwise direction.

The first laser beam, second laser beam, and third laser beam are locked onto respective resonance frequencies of the resonator 112 using their PLL and the feedback from the resonance tracking electronics 114. To determine the center of their respective resonance frequencies the first laser beam, second laser beam, and third laser beam are modulated using a resonance tracking modulation frequency. A single common-cavity modulation frequency is used as the resonance tracking modulation frequency for the first, second, and third laser beams traveling through the resonator. Common-cavity modulation is a type of modulation that uses a common resonance tracking modulation frequency signal $(f_m)$ for all light beams that travel through the resonator. For example, this can be done by individually modulating the first, second, and third laser beams before they are input into the resonator. In another example, the resonator 112 itself can be used to modulate the first, second, and third laser beams as they propagate therethrough. In yet another example, the reference laser beam can be modulated prior to being used by the PLLs in the first, second, and third laser sources 202, 204, 206 such that the resulting first, second, and third laser beams are each modulated at the resonance tracking modulation frequency. By modulating the first, second, and third laser beams at the same modulation frequency, the resonance detection errors are the same for both the clockwise and counterclockwise directions. Since the rotation measurement is the difference between the detected clockwise and counterclockwise resonance frequencies, a common error will cancel out (common mode rejection) in the rotation measurement. The embodiments described herein, enable the use of common-cavity modulation to reduce or eliminate rotation-sensing errors due to modulator imperfections. In particular, as described in more detail below, the optical mixer 110 and the resonance tracking electronics 114 are configured to reduce or eliminate errors associated with common-cavity modulation, such as errors due to backscattered waves.

Because of the modulation, the CW output of the rotation-sensing resonator 112 is a signal that is indicative of the frequency difference between the CW laser 214 frequency and the center frequency of the CW resonance frequency. The demodulated signal at the modulation frequency will pass through zero amplitude when the CW slave laser 214 frequency is at the resonance frequency. The resonance tracking electronics 114, as explained in detail below, demodulates the resonator CW output signal at the resonance tracking modulation frequency $(f_m)$ and generates a control signal $\Delta f_0$ that indicates the frequency offset to control the CW slave laser 214 to on-resonance. The resonance tracking electronics 114 outputs the control signal to the CW PLL 218 as a reference frequency. Thus, the resonance tracking electronics 114 can maintain the CW slave laser 214 on-resonance by controlling the CW frequency offset $\Delta f_0$. The resonance tracking electronics 114 maintains the CCW1 slave laser 226 and the CCW2 slave laser 238 on their respective resonances by controlling their respective frequency offsets $\Delta f_1$ and $\Delta f_2$ in a similar manner based on the resonator CCW output signal at the resonance tracking modulation frequency $(f_m)$.

The output of rotation-sensing resonator 112 is modified in order to improve error-correction of rotation-sensing error. In particular, a CW beam combiner 254 and a CCW beam combiner 256 optically mix the reference laser 116 with the respective optical output signals of the resonator 112. Thus, the CW beam combiner 254 and the CCW beam combiner 256 create an intensity modulation wherein the frequency of the intensity signals are the beat frequencies between the reference laser 116 and the optical output signals of the resonator 112. This allows for discrimination between signals carrying rotation rate information and rotation-sensing errors. It is understood that the CW beam combiner 254 and the CCW beam combiner 256 operate in a similar fashion. For example, assuming there are no rotation-sensing errors, the approximate expected output of the CW beam combiner 254 is $\Delta f_0$ since that is the beat frequency between the CW slave laser 214 and the reference laser 116. However, due to optical backscattering, some of the light from CCW1 slave laser 226, locked to a frequency having an offset of $\Delta f_1$ with the master laser 116, back reflects into the same path of the light of CW slave laser 214 in the resonator 112. The back-reflected light will undergo a different path than the CW light and therefore may appear to be off resonance, thus generating a false error signal at the resonance tracking modulation frequency. However, since the optical mixer 110 mixes the resonator output light with a beam from the reference laser 116, the backscattered light will mix with the reference beam to produce intensity modulation at the beat frequency of $\Delta f_1$, whereas the CW beam will mix with the reference beam to produce intensity modulation at $\Delta f_0$. The resonance tracking electronics 114 can be configured to filter the unwanted signal $(\Delta f_1)$ by demodulating the output signal of the CW beam combiner 254 at $\Delta f_0$ using lock-in detection (synchronous demodulation).

In one embodiment, the resonance tracking electronics 114 is configured to produce a common-cavity modulation signal 264 $(f_m)$ used to modulate the first, second, and third laser beams. In examples where the first, second, and third laser beams are individually modulated, the common-cavity modulation signal 264 is used to modulate each of the first, second, and third laser beams. In examples where the first, second, and third laser beams are modulated while they propagate through the resonator 112, the common-cavity modulation signal 264 is a sinusoidal voltage signal that drives a piezo-electric transducer tube (PZT). At least some of the optical fiber of the resonator is wrapped around the PZT. The PZT is configured so that the sinusoidal voltage signal drives the PZT to create a common modulation signal on both light beams. In examples where the reference laser beam is modulated, the common-cavity modulation signal 264 is used to modulate the reference laser beam.

As explained above, the common-cavity modulation is used to control the reference, first, second, and third laser beams to maintain them on-resonance. Since a common modulation scheme is used for all light beams, it allows for common mode rejection of additional rotation-sensing errors, thereby improving performance and reducing the complexity of the RFOG 102.

Although three slave lasers are described in the exemplary embodiments, it is to be understood that other embodiments are not to be so limited. For example, in another exemplary embodiment two slave lasers locked to a frequency offset from a reference laser 116 are used. A first slave laser produces a CW beam that is tuned to a resonance frequency of the CW direction of the resonator. A second slave laser process a CCW beam that is tuned to a resonance frequency of the CCW direction on a different resonance mode than the CW beam. Thus, in this embodiment the third laser beam (CCW2) as discussed above is not used to produce the laser beam that propagates in the CCW direction. In some such embodiments, the CCW beam is switched between a CCW resonance frequency that is at least one longitudinal resonance mode lower than the resonance frequency of the CW direction and a CCW resonance frequency that is at least one longitudinal resonance mode higher than the resonance frequency of the CW direction. In such an embodiment, common-cavity modulation is used to control the CW and CCW laser beams to on-resonance. The rotation-sensing electronics 114 is configured to discriminate between rotation-sensing errors and the rotation rate information by using the optical mixer 110 to create a beat signal.

Figure 3:
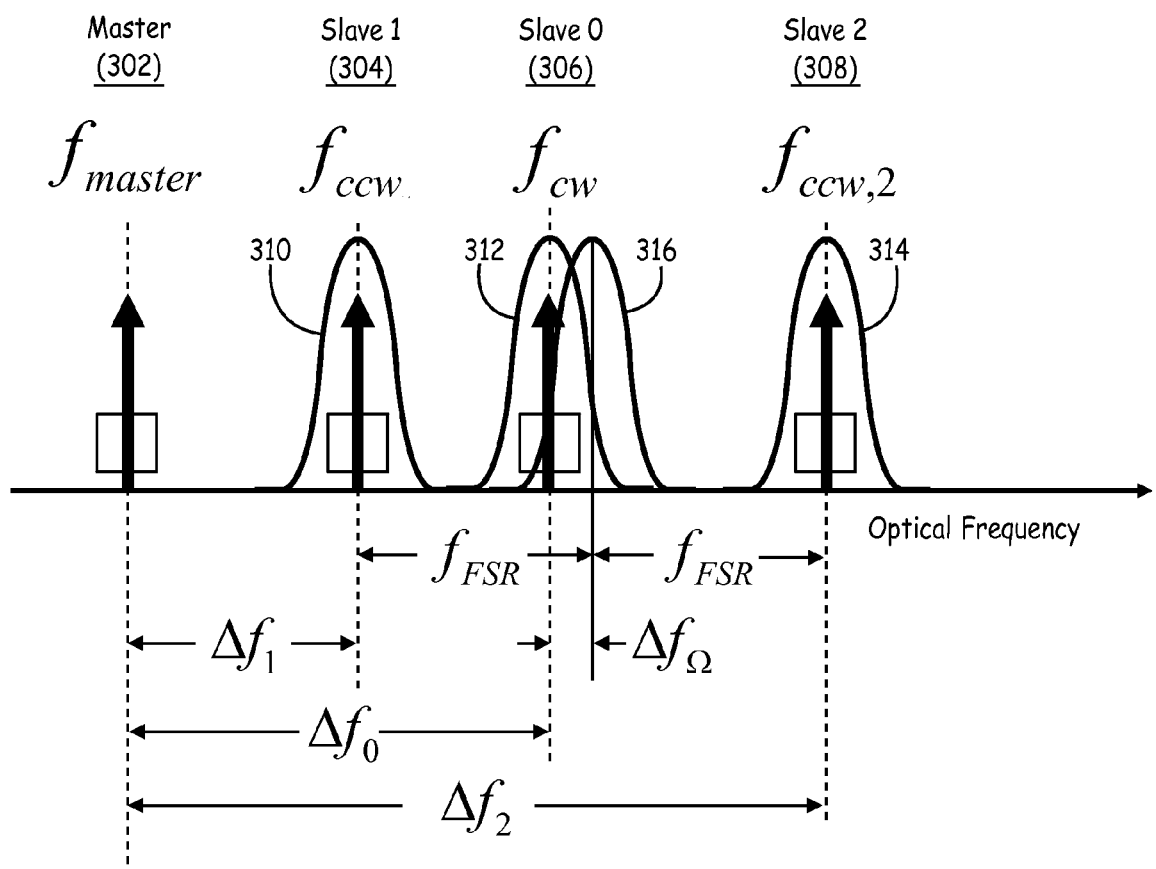
FIG. 3 is a graph of positions of an exemplary master laser frequency and three exemplary slave laser frequencies.

FIG. 3 depicts a graph of relative positions of an exemplary master laser frequency 302, a slave 0 laser frequency 302, a slave 1 laser frequency 304, and a slave 2 laser frequency 308. Master frequency 302 corresponds to the reference laser 116 and provides a stable optical frequency reference. The master frequency 302 does not have to be on a resonance of the gyro resonator. Slave 0 frequency 306 corresponds to the CW slave laser 214 and is locked to a frequency offset of $\Delta f_0$ from the master frequency 302. Slave 1 frequency 304 corresponds to the CCW1 slave laser 226 and is locked to a frequency offset of $\Delta f_1$ from the master frequency 302, which is at least one free-spectral range (e.g., one resonance mode at zero rotation rate) below Slave 0. Slave 2 frequency 308 corresponds to the CCW2 slave laser 238 and is locked to a frequency offset of $\Delta f_2$ from master laser frequency 302, which is at least one free-spectral range (e.g., one resonance mode at zero rotation rate) above Slave 0. Peaks 310 and 314 are the sensing coil resonance peaks corresponding to the CCW1 and CCW2 slave lasers, respectively. Peak 312 is the sensing coil resonance peak corresponding to the CW slave laser. Peak 316 corresponds to a CCW resonance peak at a resonance mode between the resonance modes of the CCW1 and CCW2 slave lasers. The formula for calculating rotational rate is $2\Delta f_\Omega = (\Delta f_2 - \Delta f_0) - (\Delta f_0 - \Delta f_1)$ where $\Delta f_\Omega$ is proportional to rotation rate. Thus, by subtracting the beat frequencies, as described above, an output value is produced that is about two times the $\Delta f_\Omega$.

Figure 4:
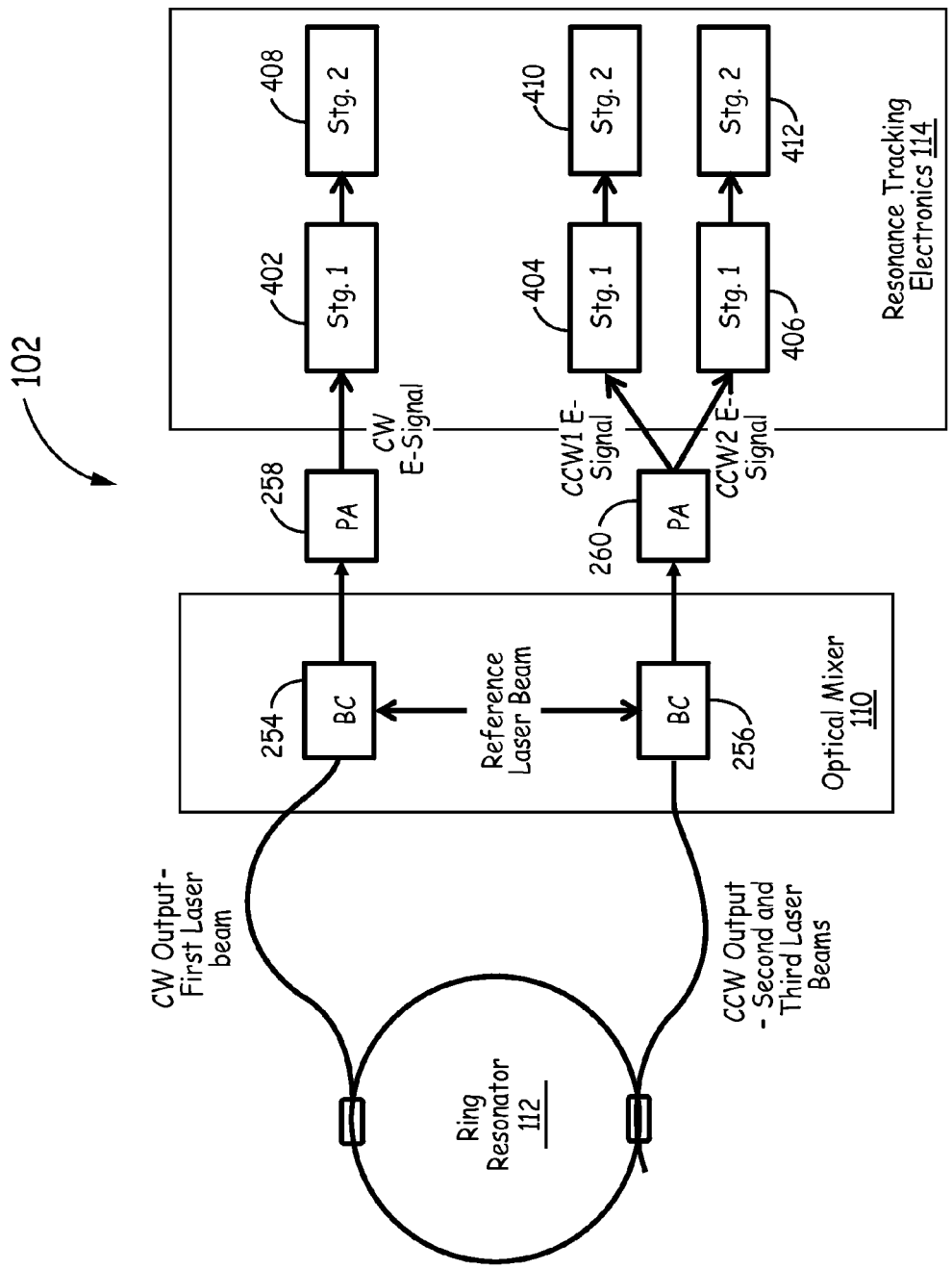
FIG. 4 is a block diagram illustrating example functionality implemented by resonance tracking electronics of an RFOG.

FIG. 4 is an example of a block diagram illustrating the functionality of the resonance tracking electronics 114 to determine a discriminant signal from an output of the resonator 112. A heterodyne detection method can be used to determine a rotation rate when multiple laser beams (e.g., the first, second, and third laser beams) are propagating through the resonator 112 and are modulated at a common modulation frequency. The heterodyne detection method involves mixing the reference laser beam with each respective output of the resonator 112. The reference laser beam is optically mixed with the CW output at the CW beam combiner 254 and with the CCW output at the CCW beam combiner 256. This has the effect of creating beat signals between the respective optical outputs of the resonator 112 and the reference laser beam. For example, if the CW output of the resonator 112 contains a CW (first) beam at a 50 MHz offset with respect to the reference laser beam, and a back-reflected CCW beam at a 51 MHz offset from the reference laser 116, the mixing of the output with the reference laser beam creates two beat frequencies at 50 MHz and 51 MHz, respectively. The output from the CW beam combiner 254 is provided to the preamp 258 which converts the optical signal to a CW electric signal. Similarly, the output from the CCW beam combiner 256 is provided to the preamp 260 which converts the optical signal into a CCW electrical signal. The CW and CCW electric signals may be conditioned as described below with respect to FIG. 6.

To generate a discriminant signals from the electrical signals, the electrical signals are passed through respective two-stage demodulations. The first stage of demodulation demodulates the electrical signal at the frequency offset of the signal that is desired to process. For example, the CW output of the resonator 112 includes a CW (first) beam at a 50 MHz offset with respect to the reference laser beam and a back-reflected CCW beam at a 51 MHz offset from the reference laser 116 as mentioned above. To determine a frequency offset of the resonator 112 it is desired to process the CW (first) laser beam and not the back-reflected CCW beam. Accordingly, the first stage 402 of demodulation for the CW output demodulates the CW electrical signal at 50 MHz. This has the effect of extracting the CW (first) laser beam from the CW electrical signal without the back-reflected CCW beam, thereby reducing other undesired components such as back-reflected light at other frequencies. Put another way, the demodulation frequency of the first stage is the frequency offset between the input laser beam (first, second, or third laser beam) to be processed and the reference laser beam. Since the first (CW) laser beam is output at the CW output of the resonator 112, the CW electrical signal is demodulated at the frequency offset of the first laser beam. The second and third (CCW) laser beams are output at the CCW output of the resonator 112. In order to process both the second and the third laser beams, the CCW electrical signal split into two: a CCW1 electrical signal and a CCW2 electrical signal. Both the CCW1 and the CCW2 electrical signal include the second and the third laser beams, as well as back-reflected CW beams. The CCW1 electrical signal is processed in order to analyze the second laser beam. Accordingly, the first stage 404 for the CCW1 electrical signal demodulates the CCW1 electrical signal at the frequency offset of the second laser beam. The CCW2 electrical signal is processed in order to analyze the third laser beam. Accordingly, the first stage 406 for the CCW2 electrical signal demodulates the CCW2 electrical signal at the frequency offset of the third laser beam.

The second stage 408, 410, 412 of demodulation for the CW, CCW1, and CCW2 electrical signals demodulates the outputs from their respective first stages at the resonance tracking modulation frequency. Since the first, second, and third laser beams were modulated at the same modulation frequency, the same (resonance tracking) demodulation frequency is used in the second stage 408, 410, 412 to demodulate each. Advantageously, since the first stage 402, 404, 406 of demodulation reduced components of each electrical signal except the signal of interest, the second stage 408, 410, 412 demodulation at the resonance tracking modulation frequency has reduced influence by these other components and is better focused on its respective signal of interest (the first, second, or third laser beam respectively). Thus, the two stage modulation enables a common resonance tracking modulation frequency to be used while still enabling each input signal (the first, second, and third laser beam) to be individually analyzed. The output of the second stage 408, 410, 412 modulation frequency is a respective discriminant signal correspond to the respective first, second, or third laser beam.

Figure 5:
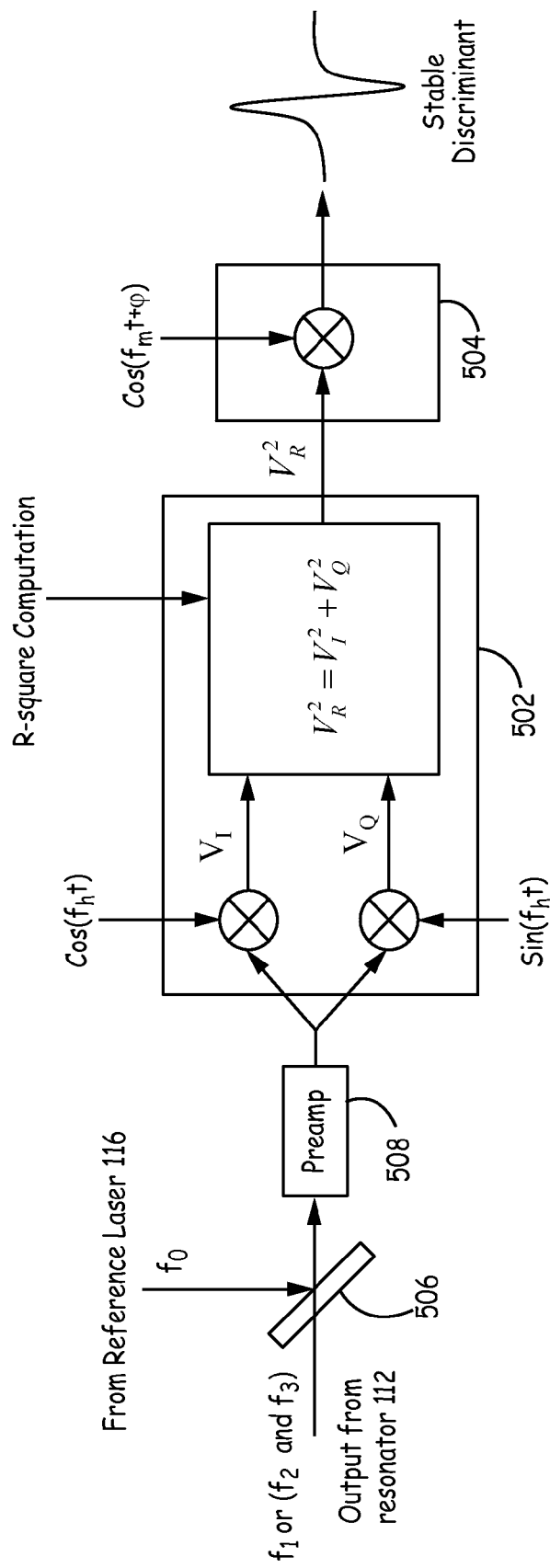
FIG. 5 is a block diagram illustrating example functionality implemented by resonance tracking electronics of an RFOG.

FIG. 5 is a block diagram illustrating an example of the functionality of a two-stage demodulation. The block diagram in FIG. 5 is generic in that the functionality can be applied to any of the CW electrical signal, the CCW1 electrical signal, and the CCW2 electrical signal. Accordingly, the first stage 502 in FIG. 5 corresponds to the first stage 402, 404, or 406 of FIG. 4 and the second stage 504 corresponds to the second stage 408, 410, or 412.

As discussed above, the output (whether CW or CCW) from the resonator 112 is mixed with a reference laser beam a beam combiner 506 (corresponding to CW beam combiner 254 or CCW beam combiner 256). The output from the beam combiner 506 is provided to a preamp 508 (corresponding to preamp 258 or preamp 260) which converts the optical signal to an electrical signal. The resulting electrical signal (CW, CCW1, or CCW2 electrical signal) is provided to the first stage 502 of demodulation.

The first stage 406 demodulates the electrical signal at both sine and cosine phases in order to generate in-phase ($V_I$) and quadrature phase ($V_Q$) information. As discussed above the frequency of the sine and cosine phase demodulation is the frequency offset of the signal of interest (the first, second, or third signal respectively). The in-phase and quadrature phase information is then processed to compute R-squared information. The R-squared information is a sum of squares of the in-phase and quadrature information. That is, the R-squared information is computed by squaring the in-phase information, squaring the quadrature information, and summing the squared in-phase and quadrature information. Mathematical analysis shows that using R-squared information as the output from the first stage 502 of demodulation creates a stable discriminant signal. In an alternative example, R information may be used as the output from the first stage 502, which is obtained by taking the square root of the R-squared information discussed above.

The second stage 504 of demodulation demodulates the R-squared (or R) information at the resonance tracking modulation frequency to generate the discriminant signal. As discussed above, each second stage 504 of demodulation (for the first, second, and third laser beams respectively) performs demodulation in the second stage 504 at the same frequency.

In an example, the first stage 502 and second stage 504d of demodulation are performed digitally by one or more processing units. In such an example, one or more analog-to-digital converters convert the respective electrical signal (CW, CCW1, and CCW2 electrical signals) into respective digital sample streams (a CW digital sample stream, a CCW1 digital sample stream, and a CCW2 digital sample stream) for processing by the one or more processing units. In some implementations of such an example, the digital sample streams are down-converted to an intermediate frequency for easier processing by the one or more processing units. In such an example, the sine and cosine demodulation, R-squared computation, and second stage demodulation are all performed by digitally processing the respective digital sample streams. In an example, the one or more processing units can include a digital signal processor (DSP), however other processing units can also be used. In other examples, the sine and cosine demodulation can be performed by an analog mixer and the R-squared computation and second stage demodulation can also be performed in analog.

Figure 6:
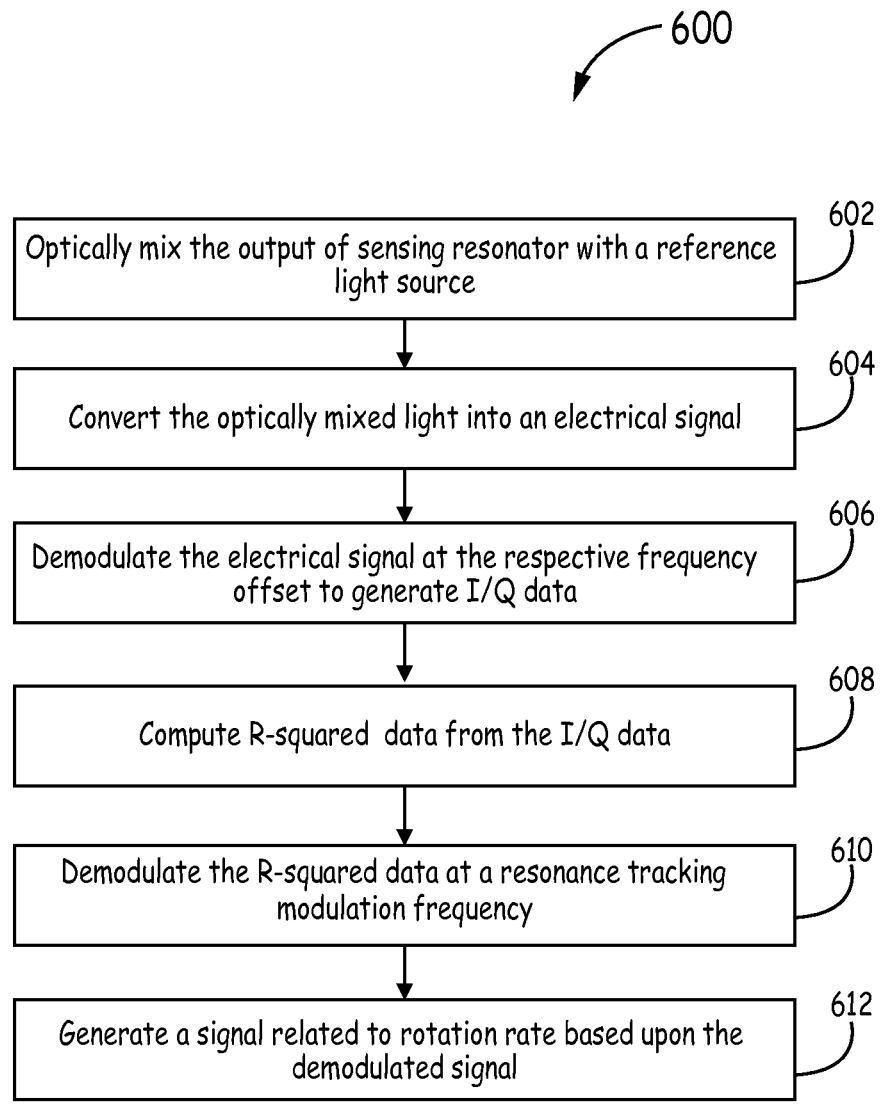
FIG. 6 is a flow chart of one embodiment of a method of reducing rotation-sensing error in a resonator fiber-optic gyroscope.

FIG. 6 is a flow chart of one embodiment of a method 600 of reducing rotation-sensing error in a resonator fiber-optic gyroscope. At block 602, method 600 optically mixes output of a resonator, such as resonator 112, with a reference laser, such as reference laser 116. This has the effect of creating beat signals between the optical output of the resonator and the reference laser. For example, if a CW output of the resonator 112 contains a CW beam at a 50 MHz offset and a back-reflected CCW beam at a 51 MHz offset from the reference laser 116, the mixing of the output with the reference laser 116 creates two beat frequencies at 50 MHz and 51 MHz, respectively. Next, at block 604, method 600 converts the beat signal into an electric signal. In one embodiment, a sensor such as CW preamp 258 or CCW preamp 260 converts the optical signal to an electric signal.

At block 606, the electrical beat signal is demodulated (first stage) at the frequency offset corresponding to the input laser beam of interest using, for example, lock-in-detection (synchronous demodulation). For example, if the output being demodulated corresponds to a CW input beam locked to a 50 MHz offset from the reference laser 116, the output is demodulated at 50 MHz, thereby reducing other undesired components such as back-reflected light at other frequencies. The demodulation at block 606 is configured to produce in-phase (I) and quadrature (Q) data. At block 608, R-squared data is computed from the I and Q data by calculating a sum of squares of the I and Q data.

At block 610, the R-squared data is demodulated a second time (second stage) at the resonance tracking modulation frequency. The resonance tracking modulation frequency is a common resonance tracking modulation frequency used for all input laser beams (the first, second, and third laser beams). At block 612, based upon the demodulated output, rotation rate information is determined, for example by the resonance tracking electronics 114, and a signal is generated which relates to the rotational rate. Although for this illustrative embodiment the steps of method 600 have been described in a certain order, the present invention is not intended to be so limited and can include variations in the order of the steps, except where explicitly limited in the method.

Figure 7:
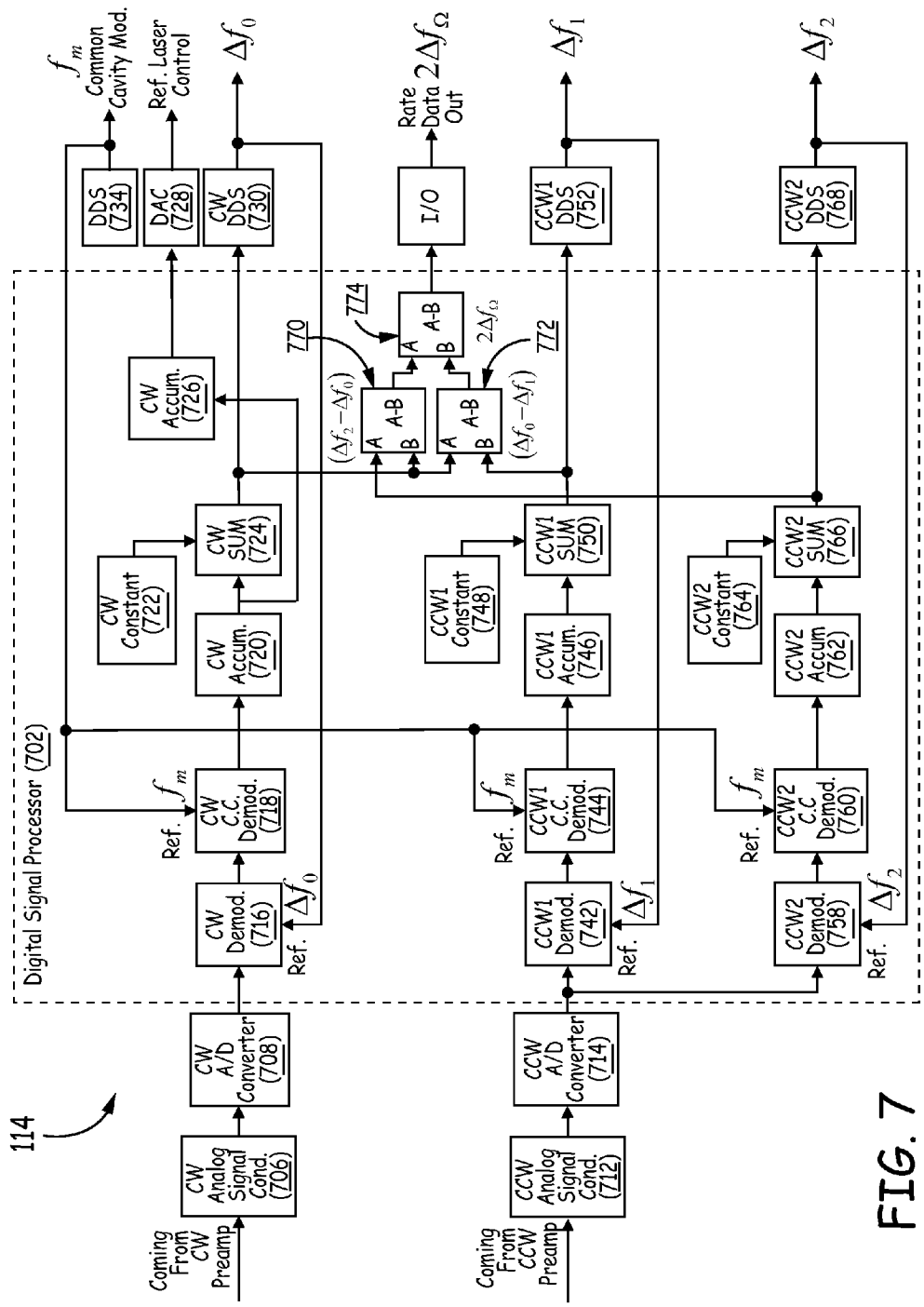
FIG. 7 is a block diagram of one embodiment of an exemplary resonance tracking electronics configured to reduce rotation-sensing errors.

FIG. 7 is a block diagram of one embodiment of an exemplary resonance tracking electronics 114 configured to reduce rotation-sensing errors. Resonance tracking electronics 114 comprises a digital signal processor 702, a CW analog signal conditioner 706, a CW analog-to-digital converter 708, a CCW analog signal conditioner 712, and a CCW analog-to-digital converter 714. The CW analog signal conditioner 706 and the CCW analog signal conditioner 712 both provide signal conditioning on the output from the respective preamp, such as CW preamp 258 or CCW preamp 260. For example, the CW analog signal conditioner 706 may include filtering of unwanted signals to allow further analog gain without saturating electronics and anti-aliasing filtering before being digitalized by the CW analog-to-digital converter 708. In another embodiment, there is an intermediate frequency (IF) stage, where the output of preamp (e.g. CW preamp 258 or CCW preamp 260) is down converted to an intermediate frequency before being digitalized by the respective analog to digital converter (e.g., CW analog-to-digital converter 508 or CCW analog-to-digital converter 714). In one implementation of this embodiment, the down conversion occurs in the CW analog signal conditioner 706 or the CCW analog signal conditioner 712, respectively. After the analog-to-digital converters (e.g. CW analog-to-digital converter 708 or CCW analog to digital converter 714) digitize the signal, the respective digital sample streams are inputted to the digital signal processor 702. The digital signal processor 702 can be implemented, for example, as a field programmable array (FPGA) chip, an application specific integrated circuit (ASIC), or a microprocessor.

Digital signal processor 702 processes the digital sample streams to perform operations on the electrical signals originating from the CW preamp 258 and the CCW preamp 260.

The CW signal is demodulated at a CW first stage demodulator 716 with a reference signal at the CW frequency offset ($\Delta f_0$) using, for example, lock-in detection (synchronous demodulation). This allows for the discrimination between rotation information and rotation-sensing errors using the beat frequencies generated from optical mixer 110. The CW first stage demodulator 716 calculates I and Q digital data streams for the electrical signal and computes an R-squared digital data stream by calculating a sum of squares of the I and Q digital data streams. After the rotation-sensing errors have been discriminated or blocked by the CW first stage demodulator 716, the R-squared digital data stream output from the CW first stage demodulator 716 is demodulated a second time at a CW common-cavity (C.C.) second stage demodulator 718. The CW C.C. second stage demodulator 718 demodulates the R-squared digital data stream from the CW first stage demodulator 716 using a signal at the common resonance tracking modulation frequency, $f_m$.

The output of the CW C.C. second stage demodulator 718 indicates whether the CW slave laser 214 is on-resonance or off resonance. On-resonance refers to a particular light beam (e.g. CW slave laser 214) having a round trip resonator path length equal to an integral number of wavelengths. Similarly, a light beam is off-resonance when its round trip resonator path length is not equal to the same integral number of wavelengths. When all beams are approximately on-resonance, the rotational rate information can be determined. In one embodiment, if the output of the CW C.C. second stage demodulator 718 is zero, then the CW slave laser 214 is on-resonance. If the output of CW C.C. second stage demodulator 718 has a non-zero value, the CW slave laser 214 is off resonance. A non-zero output is a referred to as an error signal, and can be used in a control loop, as described in detail below, to adjust the light beams to on-resonance.

The output of the CW C.C. second stage demodulator 718 is integrated in a first CW accumulator 720. The output of accumulator 720 is coupled to a CW summer 724 and to a second CW accumulator 726. The second CW accumulator 726 is coupled to a digital-to-analog converter 728, which is used to drive the reference laser driver 116. In particular, the accumulator 726 controls the reference laser frequency to keep all the lasers and electronics within normal operating range. For example, the accumulator 726 controls the reference laser frequency to keep the time-average value of accumulator 720 near zero in order to prevent the beat frequencies between the reference and slave lasers from exceeding the operating range of the electronics.

The CW summer 724 sums the output of the CW accumulator 720 with a CW constant 722. In one embodiment, CW constant 722 is a nominal value that when the output of the CW C.C. second stage demodulator 718 is zero causes the CW slave laser 214 to operate approximately on-resonance. The output of the CW summer 724 is coupled to a second input of a first subtractor 770, a first input of a second subtractor 772, and as a reference frequency to a CW direct digital synthesizer chip 730 (DDS). The output of CW DDS 730 is the new $\Delta f_0$, which is calculated from the error signal to control the CW slave laser 214 to on-resonance. This is fed as a reference signal to the CW PLL 218 and to the CW demodulator 716. Additionally, a DDS 734 outputs the common cavity modulation signal to a modulator in the resonator 112.

The digital signal processor 702 processes a first CCW slave laser (CCW1) 228 and a second CCW slave laser (CCW2) 238 in similar manners to the CW slave laser 214. Using a similar process as described above, a CCW1 first stage demodulator 742 and a CCW2 first stage demodulator 758, in this example, use lock-in detection to discriminate between different signals and output respective R-squared digital data streams. However, in this case, not only does the CCW1 demodulator 742 discriminate out rotation-sensing errors, but it also removes the signal from the CCW2 slave laser 238, leaving the signal from the CCW1 slave laser 228. Similarly, the CCW2 demodulator 758 removes the signal from the CCW1 slave laser 228, leaving the signal from the CCW2 slave laser 238.

The R-squared digital data streams from the CCW first stage demodulator 742 and the CCW2 first stage demodulator 758 are processed by respective second state demodulators (CCW1 C.C. second stage demodulator 744 and CCW2 C.C. second stage demodulator 760) which demodulate at the common resonance tracking modulation frequency. The output of the CCW1 C.C. second stage demodulator 744 is integrated in a second CCW1 accumulator 746. The output of accumulator 746 is coupled to a CCW1 summer 750. The CCW1 summer 750 sums the output of the CCW1 accumulator 746 with a CCW1 constant 748. In one embodiment, CCW1 constant 748 is a nominal value that when the output of the CCW1 C.C. second stage demodulator 744 is zero causes the CCW1 slave laser 226 to operate approximately on-resonance. The output of the CCW1 summer 750 is provided to a CCW1 direct digital synthesizer chip 752 (DDS).

Similarly, the output of the CCW2 C.C. second stage demodulator 760 is integrated in a third CCW2 accumulator 762. The output of accumulator 762 is coupled to a CCW2 summer 766. The CCW2 summer 766 sums the output of the CCW2 accumulator 762 with a CCW2 constant 764. In one embodiment, CCW2 constant 764 is a nominal value that when the output of the CCW2 C.C. second stage demodulator 760 is zero causes the CCW2 slave laser 238 to operate approximately on-resonance. The output of the CCW2 summer 766 is provided to a CCW2 direct digital synthesizer chip 768 (DDS).

The output of a CCW1 DDS 752 and a CCW2 DDS 768 is $\Delta f_1$ and $\Delta f_2$, respectively. These are fed as reference signals to the CCW1 demodulator 742 and the CCW2 demodulator 758, respectively. In addition, $\Delta f_1$ and $\Delta f_2$ are fed as reference signals to the CCW1 PLL 230 and the CCW2 PLL 242, respectively, to bring the beams on-resonance. The output of a CCW1 summer 750 is coupled to a second input of the second subtractor 772 and the output of the CCW2 summer 766 is coupled to a first input of the first subtractor 770.

In one embodiment, subtractor 770 is coupled to a first input of a subtractor 774 and subtractor 772 is coupled to a second input of the subtractor 774. Subtractors 770 through 772 function to implement the formula $2\Delta f_\Omega = (\Delta f_1 - \Delta f_2) - (\Delta f_1 - \Delta f_2)$, where the output of the subtractor 774 substantially equals twice $\Delta f_\Omega$.

The following is example calculations supporting the use of R-squared information to generate a stable discriminant signal.

Assume the light, phase modulated before entering the resonator, is $$E_{in}(t) = E_0 \exp[i\omega_c t + iM\sin(\omega_m t)] = E_0 \sum_{l=-\infty}^{\infty} J_l(M) e^{i(\omega_c + l\omega_m)t} \quad (1)$$

where $E_0$ is the input light field amplitude, $\omega_c$ is the beam optical carrier angular frequency, $\omega_m$ is the common modulation angular frequency, M is the phase modulation amplitude, $J_l$ is the Bessel function expansion coefficients, etc. The light coming out of the resonator is $$E_{out}(t) = r_1 r_2 t_{12} E_0 \sum_{l=-\infty}^{\infty} J_l(M) \sum_{n=0}^{\infty} \lambda^n e^{i(\omega_c + l\omega_m)(t - n\tau_0)} \quad (2)$$

$$= r_1 r_2 t_{12} E_0 \sum_{l=-\infty}^{\infty} J_l(M) e^{i(\omega_c + l\omega_m)t} \sum_{n=0}^{\infty} \lambda^n e^{-i(\omega_c + l\omega_m)n\tau_0}$$

$$= r_1 r_2 t_{12} E_0 \sum_{l=-\infty}^{\infty} \frac{J_l(M) e^{i(\omega_c + l\omega_m)t}}{1 - \lambda e^{-i(\omega_c + l\omega_m)\tau_0}}$$

Where $r_1$ is the input mirror field reflectivity, $r_2$ is the output mirror field reflectivity, $t_{12}$ is the field transmission from input mirror to output mirror. If the local oscillator light (the reference light field) is $$E_L(t) = E_{L0} e^{i(\omega_c + \omega_h)t + i\varphi_L} \quad (3)$$

The total electric field at the detector is $$E_D(t) = E_{out}(t) + E_L(t) = E_{L0} e^{i(\omega_c + \omega_h)t - i\varphi_L} + \quad (4)$$

$$r_1 r_2 t_{12} E_0 \sum_{l=-\infty}^{\infty} J_l(M) e^{i(\omega_c + l\omega_m)t} \sum_{n=0}^{\infty} \lambda^n e^{-i(\omega_c + l\omega_m)n\tau_0}$$

The intensity at the detector is $$I_D(t) = E_D \cdot E_D^* \quad (5)$$

$$= \left[ E_{L0} e^{i(\omega_c + \omega_h)t + i\varphi_L} + r_1 r_2 t_{12} E_0 \sum_{p=-\infty}^{\infty} J_p(M) e^{i(\omega_c + p\omega_m)t} \sum_{q=0}^{\infty} \lambda^q e^{-i(\omega_c + p\omega_m)q\tau_0} \right] \cdot$$

$$\left[ E_{L0} e^{-i(\omega_c + \omega_h)t - i\varphi_L} + r_1 r_2 t_{12} E_0 \sum_{l=-\infty}^{\infty} J_l(M) e^{-i(\omega_c + l\omega_m)t} \sum_{n=0}^{\infty} \lambda^{*n} e^{+i(\omega_c + l\omega_m)n\tau_0} \right]$$

$$= E_{L0}^2 + (r_1 r_2 t_{12})^2 E_0^2 \left[ \sum_{p=-\infty}^{\infty} J_p(M) e^{i(\omega_c + p\omega_m)t} \sum_{q=0}^{\infty} \lambda^q e^{-i(\omega_c + p\omega_m)q\tau_0} \right]$$

$$\left[ \sum_{l=-\infty}^{\infty} J_l(M) e^{-i(\omega_c + l\omega_m)t} \sum_{n=0}^{\infty} \lambda^{*n} e^{+i(\omega_c + l\omega_m)n\tau_0} \right] +$$

$$r_1 r_2 t_{12} E_{L0} E_0 e^{i(\omega_c + \omega_h)t + i\varphi_L} \left[ \sum_{l=-\infty}^{\infty} J_l(M) e^{-i(\omega_c + l\omega_m)t} \sum_{n=0}^{\infty} \lambda^{*n} e^{+i(\omega_c + l\omega_m)n\tau_0} \right] +$$

$$r_1 r_2 t_{12} E_{L0} E_0 e^{-i(\omega_c + \omega_h)t - i\varphi_L} \left[ \sum_{p=-\infty}^{\infty} J_p(M) e^{i(\omega_c + p\omega_m)t} \sum_{q=0}^{\infty} \lambda^q e^{-i(\omega_c + p\omega_m)q\tau_0} \right]$$

$$= E_{L0}^2 + (r_1 r_2 t_{12})^2 E_0^2 \left[ \sum_{p=-\infty}^{\infty} J_p(M) e^{ip\omega_m t} \sum_{q=0}^{\infty} \lambda^q e^{-i(\omega_c + p\omega_m)q\tau_0} \right]$$

$$\left[ \sum_{l=-\infty}^{\infty} J_l(M) e^{-il\omega_m t} \sum_{n=0}^{\infty} \lambda^{*n} e^{+i(\omega_c + l\omega_m)n\tau_0} \right] +$$

$$r_1 r_2 t_{12} E_{L0} E_0 e^{i\omega_h t + i\varphi_L} \left[ \sum_{l=-\infty}^{\infty} J_l(M) e^{-il\omega_m t} \sum_{n=0}^{\infty} \lambda^{*n} e^{+i(\omega_c + l\omega_m)n\tau_0} \right] + c.c.$$

The first two terms of the above equation is the local oscillator light intensity and the resonator output without heterodyning. Only the last two terms are remained when demodulation at $\omega_h$ took place. There will be many frequency components in this photodetector current, mostly in the form of $\omega_h \pm l\omega_m$.

If only the l-th harmonics on the modulation frequency are retained, the above equation becomes $$I_D = r_1 r_2 t_{12} E_{L0} E_0 e^{-i\omega_h t - i\varphi_L} \sum_{l=-\infty}^{\infty} \left[ J_l(M) e^{il\omega_m t} \sum_{n=0}^{\infty} \lambda^n e^{-i(\omega_c + l\omega_m)n\tau_0} \right] + c.c. \quad (6)$$

$$= r_1 r_2 t_{12} E_{L0} E_0 e^{-i\omega_h t} \sum_{l=-\infty}^{\infty} \left[ \frac{J_l(M) e^{il\omega_m t - i\varphi_L}}{1 - \lambda e^{-i(\omega_c + l\omega_m)\tau_0}} \right] + c.c.$$

$$= r_1 r_2 t_{12} E_{L0} E_0 \sum_{l=-\infty}^{\infty} [J_l B_l e^{-i\omega_h t + il\omega_m t - i\varphi_L + i\varphi_B}] + c.c.$$

$$= 2 r_1 r_2 t_{12} E_{L0} E_0 \sum_{l=-\infty}^{\infty} J_l B_l \cos(\omega_h t - l\omega_m t + \varphi_L - \varphi_B)$$

Where we used $$B_l e^{i\varphi_B} = \frac{1}{1 - \lambda e^{-i(\omega_c + l\omega_m)\tau_0}} \quad (7)$$

to simplify the expression. The demodulated heterodyne signal is $$I_{Dhcos}(\text{ALL}) = 2r_1 r_2 t_{12} E_{L0} E_0 \sum_{l=-\infty}^{\infty} J_l B_l \cos(\omega_h t - l\omega_m t + \varphi_L - \varphi_B)\cos(\omega_h t) \quad (8)$$

$$= 2r_1 r_2 t_{12} E_{L0} E_0 \sum_{l=-\infty}^{\infty} J_l B_l \begin{bmatrix} \cos(\omega_h t)\cos(l\omega_m t - \varphi_L + \varphi_B)\cos(\omega_h t) + \\ \sin(\omega_h t)\sin(l\omega_m t - \varphi_L + \varphi_B)\cos(\omega_h t) \end{bmatrix}$$

$$= r_1 r_2 t_{12} E_{L0} E_0 \sum_{l=-\infty}^{\infty} J_l B_l [\cos(l\omega_m t - \varphi_L + \varphi_B)[1 + \cos(2\omega_h t)] + \sin(l\omega_m t - \varphi_L + \varphi_B)\sin(2\omega_h t)]$$

$$I_{Dhcos}(LF) = r_1 r_2 t_{12} E_{L0} E_0 \sum_{l=-\infty}^{\infty} J_l B_l \cos(l\omega_m t - \varphi_L + \varphi_B)$$

$$I_{Dhsin}(\text{ALL}) = 2r_1 r_2 t_{12} E_{L0} E_0 \sum_{l=-\infty}^{\infty} J_l B_l \cos(\omega_h t - l\omega_m t + \varphi_L - \varphi_B)\sin(\omega_h t)$$

$$= 2r_1 r_2 t_{12} E_{L0} E_0 \sum_{l=-\infty}^{\infty} J_l B_l \begin{bmatrix} \cos(\omega_h t)\cos(l\omega_m t - \varphi_L + \varphi_B)\sin(\omega_h t) + \\ \sin(\omega_h t)\sin(l\omega_m t - \varphi_L + \varphi_B)\sin(\omega_h t) \end{bmatrix}$$

$$= r_1 r_2 t_{12} E_{L0} E_0 \sum_{l=-\infty}^{\infty} J_l B_l \begin{bmatrix} \cos(l\omega_m t - \varphi_L + \varphi_B)\sin(2\omega_h t) + \\ \sin(l\omega_m t - \varphi_L + \varphi_B)[1 - \cos(2\omega_h t)] \end{bmatrix}$$

$$I_{Dhsin}(LF) = r_1 r_2 t_{12} E_{L0} E_0 \sum_{l=-\infty}^{\infty} J_l B_l \sin(l\omega_m t - \varphi_L + \varphi_B)$$

The low frequency content of the demodulated photoelectric signal has many harmonic frequencies of $\omega_m$.

Directly performing the $\omega_m$ demodulation of the above signal produces $$I_{cos\text{-}cos}(DC) = I_{Dhcos}(LF)\cos(\omega_m t) \quad (9)$$

$$= r_1 r_2 t_{12} E_{L0} E_0 \sum_{l=-1,1} J_l B_l \cos(l\omega_m t - \varphi_L + \varphi_B)\cos(\omega_m t)$$

$$= r_1 r_2 t_{12} E_{L0} E_0 \begin{bmatrix} J_1 B_1 \cos(\omega_m t - \varphi_L + \varphi_B)\cos(\omega_m t) + \\ J_{-1} B_{-1} \cos(\omega_m t + \varphi_L - \varphi_B)\cos(\omega_m t) \end{bmatrix}$$

$$= \frac{1}{2} r_1 r_2 t_{12} E_{L0} E_0 \cos(\varphi_L - \varphi_B)[J_1 B_1 + J_{-1} B_{-1}]$$

$$I_{cos\text{-}sin}(DC) = I_{Dhcos}(LF)\sin(\omega_m t)$$

$$= r_1 r_2 t_{12} E_{L0} E_0 \sum_{l=-1,1} J_l B_l \cos(l\omega_m t - \varphi_L + \varphi_B)\sin(\omega_m t)$$

$$= r_1 r_2 t_{12} E_{L0} E_0 \begin{bmatrix} J_1 B_1 \cos(\omega_m t - \varphi_L + \varphi_B)\sin(\omega_m t) + \\ J_{-1} B_{-1} \cos(\omega_m t + \varphi_L - \varphi_B)\sin(\omega_m t) \end{bmatrix}$$

$$= \frac{1}{2} r_1 r_2 t_{12} E_{L0} E_0 \sin(\varphi_L - \varphi_B)[J_1 B_1 + J_{-1} B_{-1}]$$

Figure 8:
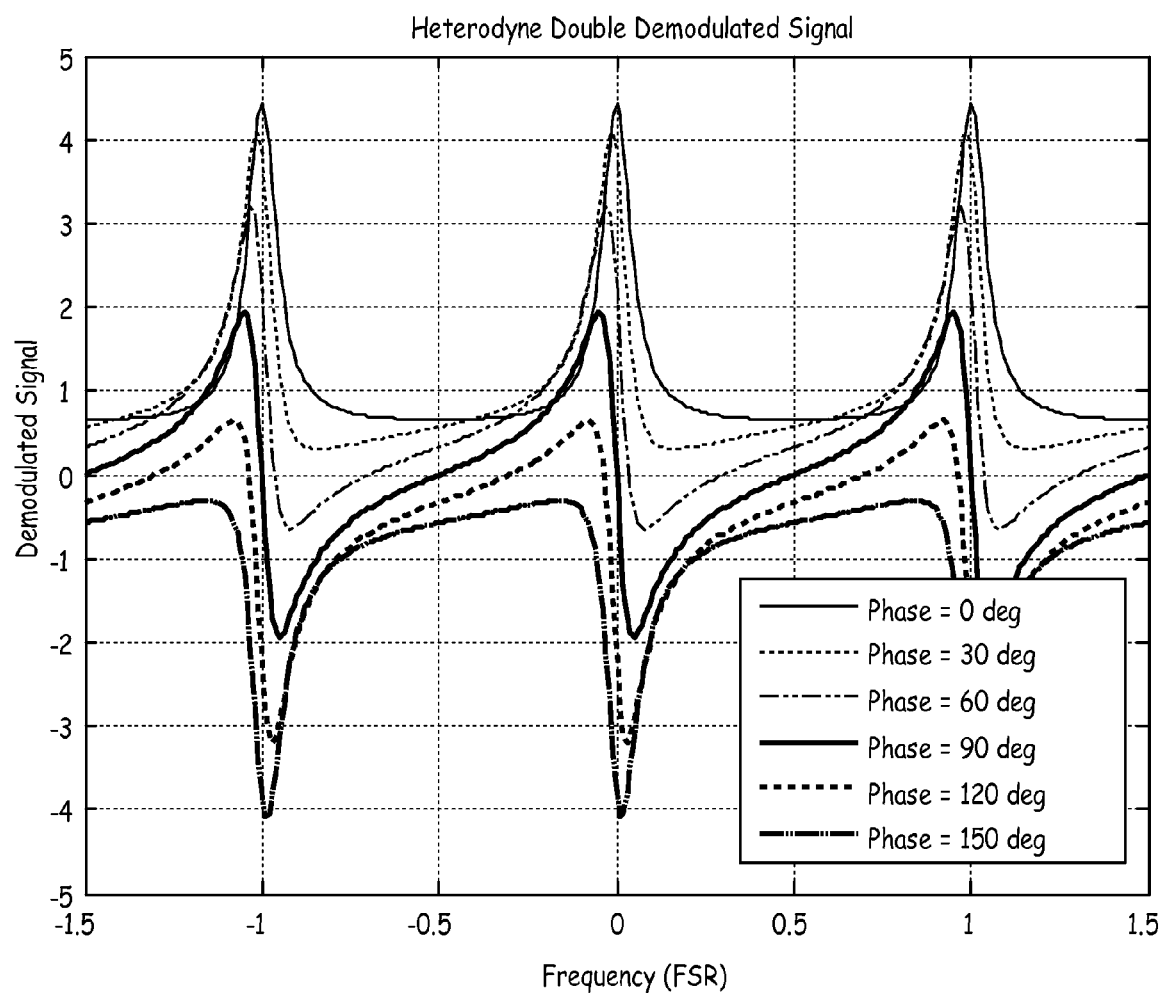
FIG. 8 is a graph of example discriminant signals produced by resonance tracking electronics using R-squared computation in an RFOG.

As seen in the above equations, the demodulated signal is not a traditional discriminant produced by standard phase sensitive detection techniques ("traditional discriminant"), and changes with relative phase variations of $\omega_L$ as shown in FIG. 8.

However, if summation of the squared in-phase and quadrature parts is performed, it results in $$I_{Dhcos}^2 + I_{Dhsin}^2 = (r_1 r_2 t_{12} E_{L0} E_0)^2 \sum_{p=-\infty}^{\infty} J_p B_p \cos(p\omega_m t - \varphi_L + \varphi_{Bp}) \sum_{l=-\infty}^{\infty} J_l B_l \cos(l\omega_m t - \varphi_L + \varphi_{Bl}) + \quad (10)$$

$$(r_1 r_2 t_{12} E_{L0} E_0)^2 \sum_{q=-\infty}^{\infty} J_q B_q \sin(q\omega_m t - \varphi_L + \varphi_{Bq}) \sum_{l=-\infty}^{\infty} J_r B_r \sin(r\omega_m t - \varphi_L + \varphi_{Br})$$

$$= \frac{1}{2}(r_1 r_2 t_{12} E_{L0} E_0)^2 \sum_p \sum_l J_p B_p J_l B_l \begin{pmatrix} \cos[(p+l)\omega_m t - 2\varphi_L + \varphi_{Bp} + \varphi_{Bl}] + \\ \cos[(p-l)\omega_m t + \varphi_{Bp} - \varphi_{Bl}] \end{pmatrix} +$$

$$\frac{1}{2}(r_1 r_2 t_{12} E_{L0} E_0)^2 \sum_q \sum_r J_q B_q J_r B_r \begin{pmatrix} -\cos[(q+r)\omega_m t - 2\varphi_L + \varphi_{Bq} + \varphi_{Br}] + \\ \cos[(q-r)\omega_m t + \varphi_{Bq} - \varphi_{Br}] \end{pmatrix}$$

$$= (r_1 r_2 t_{12} E_{L0} E_0)^2 \sum_p \sum_l J_p B_p J_l B_l \cos[(p-l)\omega_m t + \varphi_{Bp} - \varphi_{Bl}]$$

The traditional discriminant can be expressed in similar terms:

$$I_D = (r_1 r_2 t_{12})^2 E_0^2 \left[ \sum_{p=-\infty}^{\infty} J_p(M) e^{ip\omega_m t} \sum_{q=0}^{\infty} \lambda^q e^{-i(\omega_c + p\omega_m)q\tau_0} \right] \quad (11)$$

$$\left[ \sum_{l=-\infty}^{\infty} J_l(M) e^{-il\omega_m t} \sum_{n=0}^{\infty} \lambda^{*n} e^{+i(\omega_c + l\omega_m)n\tau_0} \right]$$

$$= ((r_1 r_2 t_{12})^2 E_0^2) \left[ \sum_{p=-\infty}^{\infty} \frac{J_p(M) e^{ip\omega_m t}}{1 - \lambda e^{-i(\omega_c + p\omega_m)\tau_0}} \right] \left[ \sum_{l=-\infty}^{\infty} \frac{J_l(M) e^{-il\omega_m t}}{1 - \lambda^* e^{+i(\omega_c + l\omega_m)\tau_0}} \right]$$

$$= (r_1 r_2 t_{12})^2 E_0^2 \sum_{p=-\infty}^{\infty} \sum_{l=-\infty}^{\infty} J_p B_p J_l B_l e^{i(p-l)\omega_m t} e^{i\varphi_{Bp} - i\varphi_{Bl}}$$

$$= (r_1 r_2 t_{12} E_0)^2 \sum_{p=-\infty}^{\infty} \sum_{l=-\infty}^{\infty} J_p B_p J_l B_l \cos[(p-l)\omega_m t + \varphi_{Bp} - \varphi_{Bl}],$$

imaginary part cancels

The above two terms looks identical so squaring the magnitude and demodulating at $\omega_m$ is a feasible way to restore a discriminant similar to the traditional discriminant in heterodyne detection. The squaring operation of the photocurrent is critical here to generate the right discriminant. There will also be a factor of $E_{LO}^2$ enhancement of sensitivity of the discriminant.

Although specific embodiments have been illustrated and described herein, it will be appreciated by those of ordinary skill in the art that any arrangement, which is calculated to achieve the same purpose, may be substituted for the specific embodiments shown.

EXAMPLE EMBODIMENTS

Example 1 includes a resonator fiber-optic gyro (RFOG) comprising: one or more light sources configured to produce a reference laser beam having a reference frequency, a first laser beam having a first frequency offset from the reference laser beam, and a second laser beam having a second frequency offset from the reference laser beam; a sensing resonator having a first input coupled to receive the first laser beam and a second input coupled to receive the second laser beam such that the first laser beam propagates through the sensing resonator in a first direction and exits at a first output and the second laser beam propagates through the sensing resonator in a second direction and exits at a second output, wherein the first laser beam and second laser beam are modulated at a modulation frequency; a first optical combiner coupled between a first output of the sensing resonator and a first input of the resonance tracking electronics, the first optical combiner configured to beat the first output of the sensing resonator with the reference laser beam creating a first beat signal; a second optical combiner coupled between a second output of the sensing resonator and a second input of the resonance tracking electronics, the second optical combiner configured to beat the second output of the sensing resonator with the reference laser beam creating a second beat signal; and resonance tracking electronics configured to generate a first control signal that indicates when the first laser beam is off resonance and to generate a second control signal that indicates when the second laser beam is off resonance, wherein the resonance tracking electronics is configured to: demodulate the first beat signal at the first frequency offset to generate first in-phase information and first quadrature information; square the first in-phase information; square the first quadrature information; sum the squared first in-phased information and the squared first quadrature information to generate first R-squared information; demodulate the first R-squared information at the modulation frequency to generate a first discriminant signal; demodulate the second beat signal at the second frequency offset to generate second in-phase information and second quadrature information; square the second in-phase information; square the second quadrature information; sum the squared second in-phased information and the squared second quadrature information to generate a second R-squared information; demodulate the second R-squared information at the modulation frequency to generate a second discriminant signal; and generate the first control signal and the second control signal based on the first discriminant signal and the second discriminant signal.

Example 2 includes the fiber optic gyroscope of Example 1, wherein the one or more light sources is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

Example 3 includes the fiber optic gyroscope of any of Examples 1 or 2, wherein the resonance tracking electronics include: a first analog-to-digital converter configured to generate a first digital sample stream from the first beat signal; a second analog-to-digital converter configured to generate a second digital sample stream from the second beat signal; and one or more processing devices configured to perform the demodulate, square, sum acts of the resonance tracking electronics, wherein demodulate the first beat signal at the first frequency offset includes digitally processing the first digital sample stream and wherein demodulate the second beat signal at the second frequency offset includes digitally processing the second digital sample stream.

Example 4 includes the fiber optic gyroscope of any of Examples 1-3, wherein the modulation frequency is in the range of 1-100 kHz, and the first frequency offset and the second frequency offset are in the range of 1-500 MHz.

Example 5 includes the fiber-optic gyroscope of any of Examples 1-4, wherein the one or more light sources are configured to produce a third laser beam having a third frequency offset from the reference laser beam; and wherein the fiber optic gyroscope comprises: a third optical combiner configured to optically combine the second laser beam with the third laser beam to produce a combined laser beam, wherein second input of the resonator is coupled to receive the combined laser beam such that the combined laser beam propagates through the sensing resonator in the second direction and exits at the second output; wherein the resonance tracking electronics are further configured to: demodulate the second beat signal at the third frequency offset to generate third in-phase information and third quadrature information; square the third in-phase information; square the third quadrature information; sum the squared third in-phased information and the squared third quadrature information to generate third R-squared information; demodulate the third R-squared information at the modulation frequency to generate a third discriminant signal; and determine the first control signal, the second control signal, and a third control signal that indicates when the third laser beam is off resonance based on the first discriminant signal, the second discriminant signal, and the third discriminant signal.

Example 6 includes the fiber-optic gyroscope of Example 5, wherein the resonance tracking electronics is configured to demodulate the first beat signal, second beat signal, and the third beat signal using synchronous demodulation.

Example 7 includes the fiber-optic gyroscope of any of Examples 5 or 6, wherein the resonance tracking electronics comprises: a first accumulator configured to integrate the output of the second demodulator; a first summer configured to sum the integrated output of the first accumulator with a first constant; a first direct-digital-synthesizer (DDS) coupled to the first summer and configured to output a reference signal to the first laser source which maintains the first laser source on-resonance and to output the reference signal to the first demodulator; a second DDS configured to output a signal at the common-cavity modulated frequency to the second demodulator, to the forth demodulator, and to the sixth demodulator; a second accumulator configured to integrate the output of the fourth demodulator; a second summer configured to sum the integrated output of the second accumulator with a second constant; a third DDS coupled to the second accumulator and configured to output a reference signal to the second laser source which maintains the second laser source on-resonance and to output the reference signal to the third demodulator; a third accumulator configured to integrate the output of the sixth demodulator; a third summer configured to sum the integrated output of the third accumulator with a third constant; and a fourth DDS coupled to the third accumulator and configured to output a reference signal to the third laser source which maintains the third laser source on-resonance and to output the reference signal to the fifth demodulator.

Example 8 includes the fiber-optic gyroscope of any of Examples 1-7, comprising: a first preamp coupled to the first optical combiner and the first input of the resonance tracking electronics; a second preamp coupled to the second optical combiner and the second input of the resonance tracking electronics; and wherein the resonance tracking electronics further comprises: a first analog signal conditioner receiving a first signal coupled to the first input of the resonance tracking electronics and configured to down convert the first signal to an intermediate frequency; and a second analog signal conditioner receiving a second signal coupled to the second input of the resonance tracking electronics and configured to down convert the second signal to an intermediate frequency.

Example 9 includes a system comprising: a resonator fiber-optic gyroscope configured to measure rotation rate; and a processing unit coupled to the resonator fiber-optic gyroscope and configured to perform calculations based on the rotation rate measured by the resonator fiber-optic gyroscope; wherein the resonator fiber-optic gyroscope includes: a sensing resonator have a first resonance frequency for a first laser beam propagation direction and a second resonance frequency for a second laser beam propagation direction; an optical mixer coupled to an output of the sensing resonator and configured to mix an output of the sensing resonator with a reference laser, wherein the optical mixer outputs a beat signal; and a resonance tracking electronics coupled to the optical mixer and configured to: demodulate the beat signal at a frequency offset to produce first in-phase and quadrature demodulated information; generate R-squared information from a sum of squares of the first in-phase and quadrature demodulated information; and demodulate the R-squared information at a resonance tracking modulation frequency.

Example 10 includes the system of Example 9, wherein the fiber optic gyroscope further comprises: one or more light sources configured to produce a reference laser beam having a reference frequency, a first laser beam having a first frequency offset from the reference laser beam, and a second laser beam having a second frequency offset from the reference laser beam; the sensing resonator having a first input coupled to receive the first laser beam and a second input coupled to receive the second laser beam such that the first laser beam propagates through the sensing resonator in the first laser beam propagation direction and exits at a first output and the second laser beam propagates through the sensing resonator in the second laser beam direction and exits at a second output, wherein the first laser beam and the second laser beam are modulated at a modulation frequency; wherein the optical mixer further comprises: a first optical combiner coupled between a first output of the sensing resonator and a first input of the resonance tracking electronics, the first optical combiner configured to beat the first output of the sensing resonator with the reference laser beam creating a first beat signal; and a second optical combiner coupled between a second output of the sensing resonator and a second input of the resonance tracking electronics, the second optical combiner configured to beat the second output of the sensing resonator with the reference laser beam creating a second beat signal; wherein the resonance tracking electronics is further configured to generate a first control signal that indicates when the first laser beam is off resonance and to generate a second control signal that indicates when the second laser beam is off resonance.

Example 11 includes the system of Example 10, wherein the resonance tracking electronics include: a first analog-to-digital converter configured to generate a first digital sample stream from the first beat signal; a second analog-to-digital converter configured to generate a second digital sample stream from the second beat signal; and wherein the first control signal and the second control signal is generated based on the first digital sample stream and the second digital sample stream.

Example 12 includes the system of Example 11, wherein the resonance tracking electronics comprises one or more processing devices configured to operate on the first digital sample stream and the second digital sample stream to: demodulate the first beat signal at the first frequency offset to generate first in-phase data stream and a first quadrature data stream; square the first in-phase data stream; square the first quadrature data stream; sum the squared first in-phased data stream and the squared first quadrature data stream to generate a first R-squared data stream; demodulate the first R-squared data stream at the modulation frequency to generate a first discriminant signal; demodulate the second beat signal at the second frequency offset to generate a second in-phase data stream and a second quadrature data stream; square the second in-phase data stream; square the second quadrature data stream; sum the squared second in-phased data stream and the squared second quadrature data stream to generate a second R-squared data stream; and demodulate the second R-squared data stream at the modulation frequency to generate a second discriminant signal; wherein the resonance tracking electronics is configured to generate the first control signal and the second control signal based on the first discriminant signal and the second discriminant signal.

Example 13 includes the system of Example 12, wherein the second laser source is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

Example 14 includes the system of any of Examples 12 or 13, wherein the one or more light sources are configured to produce a third laser beam having a third frequency offset from the reference laser beam; and wherein the system comprises: a third optical combiner configured to optically mix the second laser beam with the third laser beam to produce a combined laser beam, wherein the combined laser beam is coupled to the second input of the sensing resonator such that the combined laser beam propagates through the sensing resonator in the second direction and exits at the second output; wherein the one or more processing devices of the resonance tracking electronics is configured to operate on the second digital sample stream to: demodulate the second beat signal at the third frequency offset to generate a third in-phase data stream and a third quadrature data stream; square the third in-phase data stream; square the third quadrature data stream; sum the squared third in-phased data stream and the squared third quadrature data stream to generate a third R-squared data stream; demodulate the third R-squared data stream at the modulation frequency to generate a third discriminant signal; and wherein the resonance tracking electronics is configured to determine the first control signal, the second control signal, and a third control signal that indicates when the third laser beam is off resonance based on the first discriminant signal, the second discriminant signal, and the third discriminant signal.

Example 15 includes the system of Example 14, wherein the resonance tracking electronics further comprises: a first accumulator configured to integrate the output of the second demodulator; a first summer configured to sum the integrated output of the first accumulator with a first constant; a first direct-digital-synthesizer (DDS) coupled to the first summer and configured to output a reference signal to the first laser source which maintains the first laser source on-resonance and to output the reference signal to the first demodulator; a second DDS configured to output a signal at the common-cavity modulated frequency to the second demodulator, to the forth demodulator, and to the sixth demodulator; a second accumulator configured to integrate the output of the fourth demodulator; a second summer configured to sum the integrated output of the second accumulator with a second constant; a third DDS coupled to the second accumulator and configured to output a reference signal to the second laser source which maintains the second laser source on-resonance and to output the reference signal to the third demodulator; a third accumulator configured to integrate the output of the sixth demodulator; a third summer configured to sum the integrated output of the third accumulator with a third constant; and a fourth DDS coupled to the third accumulator and configured to output a reference signal to the third laser source which maintains the third laser source on-resonance and to output the reference signal to the fifth demodulator.

Example 16 includes the system of any of Examples 12-15, comprising: a first preamp coupled to the first optical combiner and the first input of the resonance tracking electronics; a second preamp coupled to the second optical combiner and the second input of the resonance tracking electronics; and wherein the resonance tracking electronics further comprises: a first analog signal conditioner receiving a first signal coupled to the first input of the resonance tracking electronics and configured to down convert the first signal to an intermediate frequency; and a second analog signal conditioner receiving a second signal coupled to the second input of the resonance tracking electronics and configured to down convert the second signal to an intermediate frequency.

Example 17 includes the system of any of Examples 10-16, wherein the modulation frequency is in the range of 1-100 kHz, and the first frequency offset and the second frequency offset are in the range of 1-500 MHz.

Example 18 includes a method of reducing rotation-sensing error in a resonator fiber-optic gyroscope, the method comprising: generating a reference laser beam having a reference frequency; generating a first laser beam having a first frequency offset from the reference laser beam; generating a second laser beam having a second frequency offset from the reference laser beam; modulating the first laser beam and the second laser beam at a modulation frequency; inputting the first laser beam to propagate in a rotation-sensing resonator in first direction; inputting the second laser beam to propagate in the rotation-sensing resonator in a second direction; optically mixing a first output of a rotation-sensing resonator with a reference laser beam to produce a first optically mixed laser beam, the first output corresponding to signals propagating in the first direction; optically mixing a second output of a rotation-sensing resonator with the reference laser beam to produce a second optically mixed laser beam, the second output corresponding to signals propagating in the second direction; converting the first optically mixed laser beam into a first electric signal; converting the second optically mixed laser beam into a second electrical signal; converting the first electrical signal to a first digital sample stream; converting the second electrical signal to a second digital sample stream; processing the first and second digital sample streams to: demodulate the first beat signal at the first frequency offset to generate a first in-phase data stream and a first quadrature data stream; square the first in-phase data stream; square the first quadrature data stream; sum the squared first in-phased data stream and the squared first quadrature data stream to generate a first R-squared data stream; demodulate the first R-squared data stream at the modulation frequency to generate a first discriminant signal; demodulate the second beat signal at the second frequency offset to generate a second in-phase data stream and a second quadrature data stream; square the second in-phase data stream; square the second quadrature data stream; sum the squared second in-phased data stream and the squared second quadrature data stream to generate a second R-squared data stream; and demodulate the second R-squared data stream at the modulation frequency to generate a second discriminant signal; and generating a signal related to rotation rate based upon the first discriminant signal and the second discriminant signal.

Example 19 includes the method of Example 18, comprising: generating third laser beam having a third frequency offset from the reference laser beam; optically mixing the third laser beam with the second laser beam to produce an optically mixed input laser beam, wherein modulating the second laser beam includes modulating the third laser beam and wherein inputting the second laser beam to propagate in the rotation-sensing resonator includes inputting the optically mixed input laser beam to propagate in the rotation-sensing resonator in the first direction; wherein processing the first and second digital sample streams include processing to: demodulate the second beat signal at the third frequency offset to generate a third in-phase data stream and a third quadrature data stream; square the third in-phase data stream; square the third quadrature data stream; sum the squared third in-phased data stream and the squared third quadrature data stream to generate a third R-squared data stream; demodulate the third R-squared data stream at the modulation frequency to generate a third discriminant signal; and wherein generate a signal related to rotation rate includes generating a signal related to rotation rate based upon the first discriminant signal, the second discriminant signal, and the third discriminant signal.

Example 20 includes the method of Example 19 comprising: generating a first control signal that indicates when the first laser beam is off resonance based on the first discriminant signal; generating a second control signal that indicates when the second laser beam is off resonance based on the second discriminant signal; and generating a third control signal that indicates when the third laser beam is off resonance based on the third discriminant signal.

What is claimed is:

1. A resonator fiber-optic gyro (RFOG) comprising:
   one or more light sources configured to produce a reference laser beam having a reference frequency, a first laser beam having a first frequency offset from the reference laser beam, and a second laser beam having a second frequency offset from the reference laser beam;
   a sensing resonator having a first input coupled to receive the first laser beam and a second input coupled to receive the second laser beam such that the first laser beam propagates through the sensing resonator in a first direction and exits at a first output and the second laser beam propagates through the sensing resonator in a second direction and exits at a second output, wherein the first laser beam and second laser beam are modulated at a modulation frequency;
   a first optical combiner coupled between a first output of the sensing resonator and a first input of the resonance tracking electronics, the first optical combiner configured to beat the first output of the sensing resonator with the reference laser beam creating a first beat signal;
   a second optical combiner coupled between a second output of the sensing resonator and a second input of the resonance tracking electronics, the second optical combiner configured to beat the second output of the sensing resonator with the reference laser beam creating a second beat signal; and
   resonance tracking electronics configured to generate a first control signal that indicates when the first laser beam is off resonance and to generate a second control signal that indicates when the second laser beam is off resonance, wherein the resonance tracking electronics is configured to:
   demodulate the first beat signal at the first frequency offset to generate first in-phase information and first quadrature information;
   square the first in-phase information;
   square the first quadrature information;
   sum the squared first in-phased information and the squared first quadrature information to generate first R-squared information;
   demodulate the first R-squared information at the modulation frequency to generate a first discriminant signal;
   demodulate the second beat signal at the second frequency offset to generate second in-phase information and second quadrature information;
   square the second in-phase information;
   square the second quadrature information;
   sum the squared second in-phased information and the squared second quadrature information to generate a second R-squared information;
   demodulate the second R-squared information at the modulation frequency to generate a second discriminant signal; and generate the first control signal and the second control signal based on the first discriminant signal and the second discriminant signal.

2. The fiber optic gyroscope of claim 1, wherein the one or more light sources is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

3. The fiber optic gyroscope of claim 1, wherein the resonance tracking electronics include:
a first analog-to-digital converter configured to generate a first digital sample stream from the first beat signal;
a second analog-to-digital converter configured to generate a second digital sample stream from the second beat signal; and
one or more processing devices configured to perform the demodulate, square, sum acts of the resonance tracking electronics, wherein demodulate the first beat signal at the first frequency offset includes digitally processing the first digital sample stream and wherein demodulate the second beat signal at the second frequency offset includes digitally processing the second digital sample stream.

4. The fiber optic gyroscope of claim 1, wherein the modulation frequency is in the range of 1-100 kHz, and the first frequency offset and the second frequency offset are in the range of 1-500 MHz.

5. The fiber-optic gyroscope of claim 1, wherein the one or more light sources are configured to produce a third laser beam having a third frequency offset from the reference laser beam; and
wherein the fiber optic gyroscope comprises:
a third optical combiner configured to optically combine the second laser beam with the third laser beam to produce a combined laser beam, wherein second input of the resonator is coupled to receive the combined laser beam such that the combined laser beam propagates through the sensing resonator in the second direction and exits at the second output;
wherein the resonance tracking electronics are further configured to:
demodulate the second beat signal at the third frequency offset to generate third in-phase information and third quadrature information;
square the third in-phase information;
square the third quadrature information;
sum the squared third in-phased information and the squared third quadrature information to generate third R-squared information;
demodulate the third R-squared information at the modulation frequency to generate a third discriminant signal; and
determine the first control signal, the second control signal, and a third control signal that indicates when the third laser beam is off resonance based on the first discriminant signal, the second discriminant signal, and the third discriminant signal.

6. The fiber-optic gyroscope of claim 5, wherein the resonance tracking electronics is configured to demodulate the first beat signal, second beat signal, and the third beat signal using synchronous demodulation.

7. The fiber-optic gyroscope of claim 5, wherein the resonance tracking electronics comprises:
a first accumulator configured to integrate the output of the second demodulator;
a first summer configured to sum the integrated output of the first accumulator with a first constant;
a first direct-digital-synthesizer (DDS) coupled to the first summer and configured to output a reference signal to the first laser source which maintains the first laser source on-resonance and to output the reference signal to the first demodulator;
a second DDS configured to output a signal at the common-cavity modulated frequency to the second demodulator, to the forth demodulator, and to the sixth demodulator;
a second accumulator configured to integrate the output of the fourth demodulator;
a second summer configured to sum the integrated output of the second accumulator with a second constant;
a third DDS coupled to the second accumulator and configured to output a reference signal to the second laser source which maintains the second laser source on-resonance and to output the reference signal to the third demodulator;
a third accumulator configured to integrate the output of the sixth demodulator;
a third summer configured to sum the integrated output of the third accumulator with a third constant; and
a fourth DDS coupled to the third accumulator and configured to output a reference signal to the third laser source which maintains the third laser source on-resonance and to output the reference signal to the fifth demodulator.

8. The fiber-optic gyroscope of claim 1, comprising:
a first preamp coupled to the first optical combiner and the first input of the resonance tracking electronics;
a second preamp coupled to the second optical combiner and the second input of the resonance tracking electronics; and
wherein the resonance tracking electronics further comprises:
a first analog signal conditioner receiving a first signal coupled to the first input of the resonance tracking electronics and configured to down convert the first signal to an intermediate frequency; and
a second analog signal conditioner receiving a second signal coupled to the second input of the resonance tracking electronics and configured to down convert the second signal to an intermediate frequency.

9. A system comprising:
a resonator fiber-optic gyroscope configured to measure rotation rate; and
a processing unit coupled to the resonator fiber-optic gyroscope and configured to perform calculations based on the rotation rate measured by the resonator fiber-optic gyroscope;
wherein the resonator fiber-optic gyroscope includes:
a sensing resonator have a first resonance frequency for a first laser beam propagation direction and a second resonance frequency for a second laser beam propagation direction;
an optical mixer coupled to an output of the sensing resonator and configured to mix an output of the sensing resonator with a reference laser, wherein the optical mixer outputs a beat signal; and
a resonance tracking electronics coupled to the optical mixer and configured to:
demodulate the beat signal at a frequency offset to produce first in-phase and quadrature demodulated information;
generate R-squared information from a sum of squares of the first in-phase and quadrature demodulated information; and demodulate the R-squared information at a resonance tracking modulation frequency.

10. The system of claim 9, wherein the fiber optic gyroscope further comprises:
one or more light sources configured to produce a reference laser beam having a reference frequency, a first laser beam having a first frequency offset from the reference laser beam, and a second laser beam having a second frequency offset from the reference laser beam;
the sensing resonator having a first input coupled to receive the first laser beam and a second input coupled to receive the second laser beam such that the first laser beam propagates through the sensing resonator in the first laser beam propagation direction and exits at a first output and the second laser beam propagates through the sensing resonator in the second laser beam direction and exits at a second output, wherein the first laser beam and the second laser beam are modulated at a modulation frequency;
wherein the optical mixer further comprises:
a first optical combiner coupled between a first output of the sensing resonator and a first input of the resonance tracking electronics, the first optical combiner configured to beat the first output of the sensing resonator with the reference laser beam creating a first beat signal; and
a second optical combiner coupled between a second output of the sensing resonator and a second input of the resonance tracking electronics, the second optical combiner configured to beat the second output of the sensing resonator with the reference laser beam creating a second beat signal;
wherein the resonance tracking electronics is further configured to generate a first control signal that indicates when the first laser beam is off resonance and to generate a second control signal that indicates when the second laser beam is off resonance.

11. The system of claim 10, wherein the resonance tracking electronics include:
a first analog-to-digital converter configured to generate a first digital sample stream from the first beat signal;
a second analog-to-digital converter configured to generate a second digital sample stream from the second beat signal; and
wherein the first control signal and the second control signal is generated based on the first digital sample stream and the second digital sample stream.

12. The system of claim 11, wherein the resonance tracking electronics comprises one or more processing devices configured to operate on the first digital sample stream and the second digital sample stream to:
demodulate the first beat signal at the first frequency offset to generate first in-phase data stream and a first quadrature data stream;
square the first in-phase data stream;
square the first quadrature data stream;
sum the squared first in-phased data stream and the squared first quadrature data stream to generate a first R-squared data stream;
demodulate the first R-squared data stream at the modulation frequency to generate a first discriminant signal;
demodulate the second beat signal at the second frequency offset to generate a second in-phase data stream and a second quadrature data stream;
square the second in-phase data stream;
square the second quadrature data stream;
sum the squared second in-phased data stream and the squared second quadrature data stream to generate a second R-squared data stream; and
demodulate the second R-squared data stream at the modulation frequency to generate a second discriminant signal;
wherein the resonance tracking electronics is configured to generate the first control signal and the second control signal based on the first discriminant signal and the second discriminant signal.

13. The system of claim 12, wherein the second laser source is configured to switch the second laser beam between a resonance frequency that is at least one longitudinal resonance mode lower than a resonance frequency of the first direction and a resonance frequency that is at least one longitudinal resonance mode higher than the resonance frequency of the first direction.

14. The system of claim 12, wherein the one or more light sources are configured to produce a third laser beam having a third frequency offset from the reference laser beam; and
wherein the system comprises:
a third optical combiner configured to optically mix the second laser beam with the third laser beam to produce a combined laser beam, wherein the combined laser beam is coupled to the second input of the sensing resonator such that the combined laser beam propagates through the sensing resonator in the second direction and exits at the second output;
wherein the one or more processing devices of the resonance tracking electronics is configured to operate on the second digital sample stream to:
demodulate the second beat signal at the third frequency offset to generate a third in-phase data stream and a third quadrature data stream;
square the third in-phase data stream;
square the third quadrature data stream;
sum the squared third in-phased data stream and the squared third quadrature data stream to generate a third R-squared data stream;
demodulate the third R-squared data stream at the modulation frequency to generate a third discriminant signal; and
wherein the resonance tracking electronics is configured to determine the first control signal, the second control signal, and a third control signal that indicates when the third laser beam is off resonance based on the first discriminant signal, the second discriminant signal, and the third discriminant signal.

15. The system of claim 14, wherein the resonance tracking electronics further comprises:
a first accumulator configured to integrate the output of the second demodulator;
a first summer configured to sum the integrated output of the first accumulator with a first constant;
a first direct-digital-synthesizer (DDS) coupled to the first summer and configured to output a reference signal to the first laser source which maintains the first laser source on-resonance and to output the reference signal to the first demodulator;
a second DDS configured to output a signal at the common-cavity modulated frequency to the second demodulator, to the forth demodulator, and to the sixth demodulator;
a second accumulator configured to integrate the output of the fourth demodulator;
a second summer configured to sum the integrated output of the second accumulator with a second constant;

a third DDS coupled to the second accumulator and configured to output a reference signal to the second laser source which maintains the second laser source on-resonance and to output the reference signal to the third demodulator;

a third accumulator configured to integrate the output of the sixth demodulator;

a third summer configured to sum the integrated output of the third accumulator with a third constant; and a fourth DDS coupled to the third accumulator and configured to output a reference signal to the third laser source which maintains the third laser source on-resonance and to output the reference signal to the fifth demodulator.

16. The system of claim 12, comprising:
a first preamp coupled to the first optical combiner and the first input of the resonance tracking electronics;
a second preamp coupled to the second optical combiner and the second input of the resonance tracking electronics; and
wherein the resonance tracking electronics further comprises:
a first analog signal conditioner receiving a first signal coupled to the first input of the resonance tracking electronics and configured to down convert the first signal to an intermediate frequency; and
a second analog signal conditioner receiving a second signal coupled to the second input of the resonance tracking electronics and configured to down convert the second signal to an intermediate frequency.

17. The system of claim 10, wherein the modulation frequency is in the range of 1-100 kHz, and the first frequency offset and the second frequency offset are in the range of 1-500 MHz.

18. A method of reducing rotation-sensing error in a resonator fiber-optic gyroscope, the method comprising:
generating a reference laser beam having a reference frequency;
generating a first laser beam having a first frequency offset from the reference laser beam;
generating a second laser beam having a second frequency offset from the reference laser beam;
modulating the first laser beam and the second laser beam at a modulation frequency;
inputting the first laser beam to propagate in a rotation-sensing resonator in first direction;
inputting the second laser beam to propagate in the rotation-sensing resonator in a second direction;
optically mixing a first output of a rotation-sensing resonator with a reference laser beam to produce a first optically mixed laser beam, the first output corresponding to signals propagating in the first direction;
optically mixing a second output of a rotation-sensing resonator with the reference laser beam to produce a second optically mixed laser beam, the second output corresponding to signals propagating in the second direction;
converting the first optically mixed laser beam into a first electric signal;
converting the second optically mixed laser beam into a second electrical signal;
converting the first electrical signal to a first digital sample stream;
converting the second electrical signal to a second digital sample stream;

processing the first and second digital sample streams to:
demodulate the first beat signal at the first frequency offset to generate a first in-phase data stream and a first quadrature data stream;
square the first in-phase data stream;
square the first quadrature data stream;
sum the squared first in-phased data stream and the squared first quadrature data stream to generate a first R-squared data stream;
demodulate the first R-squared data stream at the modulation frequency to generate a first discriminant signal;
demodulate the second beat signal at the second frequency offset to generate a second in-phase data stream and a second quadrature data stream;
square the second in-phase data stream;
square the second quadrature data stream;
sum the squared second in-phased data stream and the squared second quadrature data stream to generate a second R-squared data stream; and
demodulate the second R-squared data stream at the modulation frequency to generate a second discriminant signal; and
generating a signal related to rotation rate based upon the first discriminant signal and the second discriminant signal.

19. The method of claim 18, comprising:
generating third laser beam having a third frequency offset from the reference laser beam;
optically mixing the third laser beam with the second laser beam to produce an optically mixed input laser beam, wherein modulating the second laser beam includes modulating the third laser beam and wherein inputting the second laser beam to propagate in the rotation-sensing resonator includes inputting the optically mixed input laser beam to propagate in the rotation-sensing resonator in the first direction;
wherein processing the first and second digital sample streams include processing to:
demodulate the second beat signal at the third frequency offset to generate a third in-phase data stream and a third quadrature data stream;
square the third in-phase data stream;
square the third quadrature data stream;
sum the squared third in-phased data stream and the squared third quadrature data stream to generate a third R-squared data stream;
demodulate the third R-squared data stream at the modulation frequency to generate a third discriminant signal; and
wherein generate a signal related to rotation rate includes generating a signal related to rotation rate based upon the first discriminant signal, the second discriminant signal, and the third discriminant signal.

20. The method of claim 19 comprising:
generating a first control signal that indicates when the first laser beam is off resonance based on the first discriminant signal;
generating a second control signal that indicates when the second laser beam is off resonance based on the second discriminant signal; and
generating a third control signal that indicates when the third laser beam is off resonance based on the third discriminant signal.

* * * * *